(12) United States Patent
Matsuno

(10) Patent No.: US 7,570,326 B2
(45) Date of Patent: Aug. 4, 2009

(54) SEMI-TRANSMISSIVE TYPE LIQUID-CRYSTAL DISPLAY DEVICE AND METHOD OF FABRICATING THE SAME

(75) Inventor: Fumihiko Matsuno, Kanagawa (JP)

(73) Assignee: NEC LCD Technologies, Ltd., Kawasaki, Kanagawa (JP)

(*) Notice: Subject to any disclaimer, the term of this patent is extended or adjusted under 35 U.S.C. 154(b) by 252 days.

(21) Appl. No.: 11/798,954

(22) Filed: May 18, 2007

(65) Prior Publication Data

US 2007/0268432 A1 Nov. 22, 2007

(30) Foreign Application Priority Data

May 18, 2006 (JP) ............................. 2006-138575

(51) Int. Cl.
*G02F 1/1335* (2006.01)
*G02F 1/13* (2006.01)

(52) U.S. Cl. ...................................... 349/114; 349/187

(58) Field of Classification Search ................. 349/114, 349/56, 58, 138, 122, 139, 140, 142, 143, 349/144, 147, 155, 156, 187, 190
See application file for complete search history.

(56) References Cited

U.S. PATENT DOCUMENTS 6,195,140 B1 * 2/2001 Kubo et al. .................... 349/44
6,452,654 B2 * 9/2002 Kubo et al. ................... 349/114
6,847,426 B2 * 1/2005 Fujimori et al. .............. 349/113
7,142,272 B2 * 11/2006 Fujimori et al. .............. 349/114
2007/0268432 A1 * 11/2007 Matsuno ...................... 349/114
2008/0049177 A1 * 2/2008 Motoshima et al. .......... 349/114

FOREIGN PATENT DOCUMENTS

| JP | 11-281992 | 10/1999 | ............. 349/114 X |
| JP | 2002-229049 | 8/2002 | ............. 349/114 X |
| JP | 2004-101792 | 4/2004 | ............. 349/114 X |

* cited by examiner

*Primary Examiner*—Brian M Healy
(74) *Attorney, Agent, or Firm*—McGinn IP Law Group, PLLC

(57) ABSTRACT

A semi-transmissive type liquid-crystal display device makes it possible to easily optimize both the reflection characteristic (reflection mode) and the transmission characteristic (transmission mode) while keeping a high aperture ratio, thereby improving the display quality. A liquid crystal layer is disposed between first and second substrates. Switching elements are formed on the first substrate for respective pixel regions. Each of the pixel regions is divided into a transmission region and a reflection region. An interlayer insulating film is formed to cover the switching elements on the first substrate. In the transmission region, a transmission electrode is formed on the interlayer insulating film. In the reflection region, a reflection electrode is formed on the interlayer insulating film. The surface of the interlayer insulating film is partially removed, thereby forming a level difference between the transmission and reflection regions.

11 Claims, 16 Drawing Sheets

SEMI-TRANSMISSIVE TYPE LIQUID-CRYSTAL DISPLAY DEVICE AND METHOD OF FABRICATING THE SAME

BACKGROUND OF THE INVENTION

1. Field of the Invention

The present invention relates to a semi-transmissive (trans-reflective) type liquid-crystal display (LCD) device and a method of fabricating the same. More particularly, the invention relates to a semi-transmissive type LCD device having pixel regions each of which is divided into a transmission region and a reflection region and a method of fabricating the device.

2. Description of the Related Art

In recent years, subsequent to the diffusion of portable information-processing equipment, the semi-transmissive type LCD device has been developed and used practically. With the device of this type, in a place where the ambient light is insufficient (i.e., a dark place), images are displayed by causing the light emitted from the backlight unit to pass through the liquid crystal layer. On the other hand, in a place where the ambient light is sufficient (i.e., a light place), images are displayed by causing the ambient light reflected by the internal reflector electrodes to pass through the liquid crystal layer.

With the semi-transmissive type LCD device having such the structure as above, the backlight is turned on and the images are displayed in the transmission mode, thereby raising the visibility in a dark place. The backlight is turned off and the images are displayed in the reflection mode, thereby reducing the power dissipation in a light place. Because of such the advantage, this device meets the two inconsistent demands to prolong the operable time and to reduce the weight.

The semi-transmissive type LCD device may have a structure that each of the pixel regions is divided into a transmission region and a reflection region. With this structure, the interlayer insulating film, which is formed to cover all the pixel regions, may be left in both the transmission region and the reflection region. Alternately, the said interlayer insulating film may be left in only the reflection region and removed in the transmission region. With the semi-transmissive type LCD device having this structure, a transmission electrode is placed in the transmission region and a reflection electrode is placed in the reflection region. In other words, each of the pixel electrodes is formed by the transmission electrode and the reflection electrode.

The Japanese Non-Examined Patent Publication No. 2004-101792 discloses a semi-transmissive type LCD device, which has the structure that the above-described interlayer insulating film is left only in the reflection region and removed in the transmission region (see FIGS. 1 to 3, paragraphs 0052 to 0058 and 0063 to 0067). The Thin-Film Transistor (TFT) array substrate used for this device is shown in FIG. 1, which is a partial cross-sectional view showing the pixel structure of the TFT array substrate. As shown in FIG. 1, the pixel region P corresponding to the said pixel is divided into a transmission region T and a reflection region R.

The prior-art TFT array substrate 121 shown in FIG. 1 comprises an insulative, transparent plate 101 on which gate electrodes 102 are formed. A gate insulating film 104 is formed on the plate 101 to cover the gate electrodes 102. On the gate insulating film 104, island-shaped semiconductor films 105 are formed to overlap with the corresponding gate electrodes 102. Pairs of island-shaped, heavily doped semiconductor films 106a and 106b are formed on the corresponding semiconductor films 105. Source electrodes 107 and drain electrodes 108 are overlapped with the corresponding pairs of semiconductor films 106a and 106b, respectively. The combination of the gate electrode 102, the gate insulating film 104, the semiconductor film 105, the pair of semiconductor films 106a and 106b, the source electrode 107 and the drain electrode 108 constitutes a TFT 115 as a switching element.

The TFTs 115 are covered with a passivation film 110. On the passivation film 110, transmission electrodes 113 are selectively formed. The transmission electrodes 113 are extended to not only the transmission regions T but also the reflection regions R. The transmission electrodes 113 are electrically connected to the corresponding drain electrodes 108 by way of the corresponding contact holes 110a.

An interlayer insulating film 111 is selectively formed on the transmission electrodes 113 and the exposed parts of the passivation film 110 from the transmission electrodes 113. As shown in FIG. 1, the interlayer insulating film 111 does not exist in the transmission regions T and therefore, the transmission electrodes 113 are exposed from the interlayer insulating film 111 in the corresponding transmission regions T.

On the interlayer insulating film 111, reflection electrodes 114 are selectively formed. The reflection electrodes 114 are located in only the corresponding reflection regions R. The reflection electrodes 114 are electrically connected to the corresponding transmission electrodes 113 by way of the corresponding contact holes 112 at the overlapped positions with the corresponding contact holes 110a. In addition convex and concave shapes in other words, protrusions and depressions, are formed on the surface of the interlayer insulating film 111, which are provided to enhance the reflection effect of the reflection electrodes 14 formed on the film 111.

The TFT array substrate 121 shown in FIG. 1 for the prior-art semi-transmissive type LCD device is fabricated in the following way.

First, the gate electrodes 102 are formed on the insulative, transparent plate 101 and then, the gate insulating film 104 is formed on the plate 101 to cover the gate electrodes 102. Next, on the gate insulating film 104, the island-shaped semiconductor films 105 and the pairs of island-shaped, heavily doped semiconductor films 106a and 106b are successively formed to overlap with the corresponding gate electrodes 102 in this order. Thereafter, the source electrodes 107 and the drain electrodes 108 are overlapped with the semiconductor films 106a and 106b, respectively, thereby forming the TFTs 115. Then, the TFTs 115 are covered with the passivation film 110, and the transmission electrodes 113 are selectively formed on the passivation film 110 thus formed. At this time, the transmission electrodes 113 are contacted with the corresponding drain electrodes 108 by way of the corresponding contact holes 110a. All the process steps described so far can be carried out by known methods.

Subsequently, to form the interlayer insulating film 111, an insulative organic resin with photosensitivity is coated on the transmission electrodes 113 and the exposed parts of the passivation film 110 from the transmission electrodes 113, forming an organic resin film. Thereafter, the organic resin film thus formed is selectively exposed to predetermined light with a photomask. At this time, the pattern of the photomask is adjusted in such a way that the exposure energies are different from each other in the areas where the organic resin film is completely removed (which are the areas corresponding to the contact holes 112 and the transmission regions T) and in the areas where the convex and concave shapes are formed on the surface of the organic resin film (which are the areas corresponding to the reflection regions R except for those corresponding to the contact holes 112). The organic resin film thus exposed is then developed. As a result, the patterned organic resin film (i.e., the interlayer insulating film 111) whose thickness varies in accordance with the positions is obtained.

Concretely speaking, different photomasks are used for the areas where the organic resin film is completely removed and the areas where the convex and concave shapes (protrusions and depressions) are formed on the surface of the organic resin film. Alternately, a half-tone photomask (or a gray-tone photomask) on which a semi-transmissive film is partially formed is used. As a result, when the exposure energy for the areas where the organic resin film is completely removed is defined as 100%, the exposure energy for the areas where the convex and concave shapes are formed on the surface of the organic resin film is set at a value in the range from 10% to 50%.

Following this, the reflection electrodes 114 are selectively formed on the patterned organic resin film (i.e., the patterned interlayer insulating film 111) thus formed. In this way, the TFT array substrate 121 shown in FIG. 1 is obtained.

The Japanese Patent No. 3410656 discloses another semi-transmissive type LCD device, which has the structure that the above-described interlayer insulating film is left in not only the reflection region but also the transmission region (see FIGS. 1 to 4, paragraphs 0015 to 0016). The TFT array substrate used for this device is shown in FIG. 2, which is a partial cross-sectional view showing the pixel structure of the TFT array substrate. As shown in FIG. 2, the pixel region P corresponding to the said pixel is divided into a transmission region T and a reflection region R.

The prior-art TFT array substrate 221 shown in FIG. 2 comprises an insulative, transparent plate 201 on which gate electrodes 202 are formed. A gate insulating film 204 is formed on the plate 201 to cover the gate electrodes 202. On the gate insulating film 204, island-shaped semiconductor films 205 are formed to overlap with the corresponding gate electrodes 202. On the semiconductor films 205, pairs of island-shaped, heavily doped semiconductor contact films 206a and 206b are formed on the corresponding semiconductor films 205. The source electrodes 207 and the drain electrodes 208 are overlapped with the corresponding pairs, of semiconductor contact films 206a and 206b, respectively. The combination of the gate electrode 202, the gate insulating film 204, the semiconductor film 205, the pair of semiconductor contact films 206a and 206b, the source electrode 207 and the drain electrode 208 constitute a TFT 215 as a switching element.

With the TFT array substrate 221 of FIG. 2, no passivation film is provided, and an interlayer insulating film 211 is directly formed on the gate insulating film 204. As shown in FIG. 2, the interlayer insulating film 211 is present in not only the reflection regions R but also the transmission regions T. On the interlayer insulating film 211, transmission electrodes 213 are selectively formed. The reflection electrodes 214 are selectively formed on the corresponding transmission electrodes 213. The transmission electrodes 213, which are located in the corresponding transmission regions T, are extended to the corresponding reflection regions R and contacted with the corresponding drain electrodes 208 by way of the corresponding contact holes 212. The reflection electrodes 214, which are located in only the corresponding reflection regions R, are extended to the inside of the corresponding contact holes 212. The convex and concave shapes formed on the surface of the interlayer insulating film 211 exist in only the reflection regions R.

The TFT array substrate 221 shown in FIG. 2 for the prior-art semi-transmissive type LCD device is fabricated in the following way.

First, the gate electrodes 202 are formed on the insulative, transparent plate 201 and then, the gate insulating film 204 is formed on the plate 201 to cover the gate electrodes 202. Next, on the gate insulating film 204, the island-shaped semiconductor films 205 and island-shaped, heavily doped semiconductor contact films for the semiconductor contact films 206a and 206b are successively formed to overlap with the corresponding gate electrodes 202 in this order. Thereafter, the source electrodes 207 and the drain electrodes 208 are formed to overlap with the corresponding semiconductor films 205 and the semiconductor contact films 206a and 206b. Using the source and drain electrodes 207 and 208 as a mask, the island-shaped, heavily doped semiconductor contact films are selectively etched, thereby forming the pairs of semiconductor contact films 206a and 206b. In this way, the TFTs 215 are obtained. All the process steps described so far can be carried out by known methods.

Subsequently, an insulative organic resin with photosensitivity is coated on the TFTs 215 and the exposed parts of the gate insulating film 204 from the TFTs 215, thereby forming the interlayer insulating film 211. Then, the interlayer insulating film 211 thus formed is selectively exposed and developed. Thus, the contact holes 212 penetrating through the interlayer insulating film 211 to the corresponding drain electrodes 208 are formed and at the same time, the convex and concave shapes are formed on the surface of the interlayer insulating film 211 in the reflection regions R. In this way, the interlayer insulating film 211 having the pattern of FIG. 2 is obtained. Following this, the transmission electrodes 213 are selectively formed on the interlayer insulating film 211 thus patterned. The reflection electrodes 214 are selectively formed on the corresponding transmission electrodes 213 thus formed. In this way, the TFT array substrate 221 shown in FIG. 2 is fabricated.

The Japanese Non-Examined Patent Publication No. 2002-229049 discloses, like the previously-referred Japanese Patent No. 3410656, still another semi-transmissive type LCD device, which has the structure that the above-described interlayer insulating film is left in not only the reflection region but also the transmission region (see FIGS. 1 to 2, paragraphs 0010 to 0013). The pixel electrode of this device comprises a stacked structure including at least two layers of a transmission electrode layer and a semi-transmission electrode layer. This stacked structure is formed by a single patterning process of these two electrode layers using photoresist, resulting in the said pixel electrode.

According to the Publication No. 2002-229049, it is preferred that the semi-transmission electrode layer is formed by an Al, Al alloy, Ag or Ag alloy layer having a thickness of 20 nm or less. This is because the layers of these metals or alloys are high in reflectance and because the pixel electrode with a desired transmittance is obtainable. Moreover, it is preferred that the transmission electrode layer is formed by an indium tin oxide layer. This is because the indium tin oxide layer is low in resistance and transparent.

In this way, with the semi-transmissive type LCD device disclosed in the above-described Publication No. 2002-229049, the pixel electrode has the stacked structure comprising the transmission electrode layer and the semi-transmission layer. Therefore, the interlayer insulating film is left in not only the reflection regions but also the transmission regions. However, the pixel region P is not divided into the transmission region T and the reflection region R. As a result, this device is apparently different in structure from the device (see FIG. 2) disclosed in the previously-referred Patent No. 3410656.

With the prior-art LCD device disclosed in the Publication No. 2004-101792, as shown in FIG. 1, the interlayer insulating film 111 is left in only the reflection region R and does not exist in the transmission region T. Thus, by adjusting the thickness of the interlayer insulating film 111 left in the reflection region R, the optical path length of the light penetrating through the liquid crystal layer can be adjusted easily. Therefore, the optical path lengths of the light penetrating through the liquid crystal layer in the reflection region R and the transmission region T can be matched. This means that both the reflection characteristic and the transmission characteristic can be optimized easily.

However, the interlayer insulating film 111 does not exist in the transmission region T and thus, the pixel electrode (i.e., the transmission electrode 113) cannot be extended to overlap with the wiring lines. As a result, a problem that the aperture ratio decreases occurs.

With the prior-art LCD device disclosed in the Patent No. 3410656, as shown in FIG. 2, the interlayer insulating film 211 is left in not only the reflection region R but also the transmission region T. Thus, contrary to the prior-art device of FIG. 1, the pixel electrode (i.e., the transmission electrode 213) can be extended to overlap with the wiring lines and as a result, the aperture ratio can be increased. On the other hand, however, the interlayer insulating film 211 exists in the whole pixel region P and therefore, it is not easy to form a desired level difference between the reflection region R and the transmission region T.

As a result, there is a problem that optimization of both the reflection characteristic (i.e., the reflection mode) and the transmission characteristic (i.e., the transmission mode) is difficult by matching the optical path lengths of the light penetrating through the liquid crystal layer in the reflection region R and the transmission region T.

With the prior-art LCD device disclosed in the Publication No. 2002-229049, each pixel region is not divided into the transmission region and the reflection region. Thus, similar to the prior-art device shown in FIG. 2, there is a problem that optimization of both the reflection characteristic (i.e., the reflection mode) and the transmission characteristic (i.e., the transmission mode) is not easy.

SUMMARY OF THE INVENTION

The present invention was created through the consideration about the above-described problems.

An object of the present invention is to provide a semi-transmissive type LCD device, where each pixel region is divided into a transmission region and a reflection region, that makes it easy to optimize both the reflection characteristic (reflection mode) and the transmission characteristic (transmission mode) while keeping a high aperture ratio, and a method of fabricating the device.

Another object of the present invention is to provide a semi-transmissive type LCD device that improves the display quality, and a method of fabricating the device.

The above objects together with others not specifically mentioned will become clear to those skilled in the art from the following description.

According to the first aspect of the present invention, a semi-transmissive type LCD device is provided, which comprises;

a first substrate and a second substrate disposed to be opposite at an approximately equal gap;

a liquid crystal layer disposed between the first substrate and the second substrate;

switching elements formed on the first substrate for respective pixel regions;

an interlayer insulating film formed to cover the switching elements on the first substrate; and each of the pixel regions being divided into a transmission region where a transmission electrode is formed on the interlayer insulating film and a reflection region where a reflection electrode is formed on the interlayer insulating film;

wherein a level difference between the transmission region and the reflection region is formed on a surface of the interlayer insulating film in each of the pixel regions.

With the semi-transmissive type LCD device according to the first aspect of the invention, as explained above, the interlayer insulating film covers the transmission region and the reflection region in each of the pixel regions. Moreover, the level difference between the transmission and reflection regions is formed on the surface of the interlayer insulating film in each pixel region. Thus, the pixel electrodes (i.e., the transmission electrodes and the reflection electrodes) placed on the interlayer insulating film can be extended to overlap with the wiring lines formed in the peripheral area of the pixel electrodes. Accordingly, a high aperture ratio similar to the prior-art semi-transmissive LCD device shown in FIG. 2 can be obtained and kept.

Furthermore, by adjusting the removing amount (removing depth) of the interlayer insulating film from its surface in the transmission regions and that in the reflection regions, the level difference between the transmission and reflection regions is changeable. This means that the optical path lengths of the light penetrating through the liquid crystal layer in the transmission and reflection regions can be designed to be matched easily.

In this way, both the reflection characteristic (reflection mode) and the transmission characteristic (transmission mode) can be easily optimized while keeping the high aperture ratio. As a result, the display quality is easily improved.

In a preferred embodiment of the device according to the first aspect of the invention, the interlayer insulating film is made of a transmissive insulating material having photosensitivity. In this embodiment, by only performing the exposure process or processes while changing the exposure energies in accordance with the positions, the interlayer insulating film can be obtained without increasing the film formation step and the etching step. Accordingly, there is an advantage that the fabrication process steps can be prevented from being complicated.

In another preferred embodiment of the device according to the first aspect of the invention, the interlayer insulating film has convex and concave shapes, in other words, protrusions and depressions, for diffusing the reflected light and enhancing an optical reflection effect on its surface in the reflection region; and the interlayer insulating film has contact holes, each of which reaches a corresponding one of the switching elements.

In this embodiment, there is an advantage that different thicknesses can be formed to the interlayer insulating film in the transmission and reflection regions and at the same time, the convex and concave shapes and the contact holes of the interlayer insulating film can be formed by only exposing the interlayer insulating film to light in such a way that the first positions where the convex and concave shapes are to be formed are exposed at a first exposure energy, the second positions corresponding to the transmission regions are exposed at a second exposure energy different from the first exposure energy, and the third positions corresponding to the contact holes are exposed at a third exposure energy different from the first and second exposure energies.

Moreover, in this embodiment, it is preferred that the contact holes are located in the respective reflection regions; the transmission electrodes are extended to the corresponding contact holes; the transmission electrodes are electrically connected to the respective switching elements by way of the corresponding contact holes; and the reflection electrodes are electrically connected to the respective transmission electrodes.

In this case, since the transmission electrodes, which usually are made of a material with poor step coverage, are extended to the corresponding contact holes, the overlapped parts of the transmission electrodes with the corresponding reflection electrodes are expanded. As a result, an advantage that connection failure does not occur between the transmission electrodes and the corresponding reflection electrodes is obtainable.

According to a second aspect of the present invention, a method of fabricating a semi-transmissive type LCD device is provided, the device comprising;

a first substrate and a second substrate disposed to be opposite at an approximately equal gap;

a liquid crystal layer disposed between the first substrate and the second substrate;

switching elements formed on the first substrate for respective pixel regions;

an interlayer insulating film formed to cover the switching elements on the first substrate; and each of the pixel regions being divided into a transmission region where a transmission electrode is formed on the interlayer insulating film and a reflection region where a reflection electrode is formed on the interlayer insulating film;

the method comprising the steps of:

forming an insulating material film having photosensitivity on the first substrate for forming the interlayer insulating film;

exposing positions of the interlayer insulating film corresponding to the transmission regions and positions of the interlayer insulating film corresponding to the reflection regions to light at different exposure energies, respectively; and selectively removing the exposed positions of the interlayer insulating film by development, thereby forming a level difference between the transmission region and the reflection region on a surface of the interlayer insulating film in each of the pixel regions.

With the method according to the second aspect of the present invention, as explained above, the insulating material film having photosensitivity formed on the first substrate is exposed to light at different exposure energies in the first positions corresponding to the transmission regions and the second positions corresponding to the reflection regions, respectively. Thereafter, these exposed positions of the interlayer insulating film are selectively removed by development, thereby forming a level difference between the transmission and reflection regions on the surface of the interlayer insulating film in each of the pixel regions. Accordingly, the semi-transmissive type LCD device according to the first aspect of the invention can be fabricated.

Moreover, the patterned interlayer insulating film is obtained as desired by exposing the interlayer insulating film at different exposure energies in accordance with the positions and therefore, it is unnecessary to add film formation steps and etching steps. As a result, the fabrication process steps can be prevented from being complicated.

In a preferred embodiment of the method according to the second aspect of the present invention, a first area of the surface of the interlayer insulating film corresponding to the reflection region is selectively exposed to the light at a first exposure energy, thereby forming convex and concave shapes (or protrusions and depressions) for diffusing the reflected light and enhancing an optical reflection effect in the first area: a second area of the surface of the interlayer insulating film corresponding to the transmission region is selectively exposed to the light at a second exposure energy different from the first exposure energy, thereby forming the transmission region; and a third area of the surface of the interlayer insulating film is selectively exposed to the light at a third exposure energy different from the second and third exposure energies, thereby forming contact holes reaching the corresponding switching elements.

In this embodiment, there is an advantage that by only setting the first, second and third exposure energies appropriately, the interlayer insulating film having the desired level difference between the transmission and reflection regions is obtainable and at the same time, the convex and concave shapes (or protrusions and depressions) and the contact holes are obtainable.

In another preferred embodiment of the method according to the second aspect of the present invention, the first, second and third areas of the surface of the interlayer insulating film are simultaneously exposed to the light in a first exposure step; the second and third areas of the surface of the interlayer insulating film are simultaneously exposed to the light in a second exposure step; and the third area of the surface of the interlayer insulating film is exposed to the light in a third exposure step; whereby the first, second and third exposure energies corresponding respectively to the first, second and third areas are realized.

In this embodiment, the third area is exposed to the light three times in the first, second, and third exposure steps, the second area is exposed to the light twice in the first and second exposure steps, and the first area is exposed to the light once in the first exposure step. In this way, the first exposure energy corresponding to the first area, the second exposure energy corresponding to the second area and the third exposure energy corresponding to the third area are realized. The first to third areas may be separately exposed to the light in the respective exposure steps. However, by performing a plurality of exposure steps to the area where the removing amount is large in this way, there is an advantage that the tact time can be shortened. In addition, since simply structured photomasks, which have no transmitting-light attenuating film (e.g., a semi-transmissive film, a light-shielding film having minute patterns equal to or less than the limit of resolution, or the like), may be used as the photomask to be used for the first to third exposure steps, there is another advantage that the photomask is easily formed.

In still another preferred embodiment of the method according to the second aspect of the present invention, the first, second and third areas of the surface of the interlayer insulating film are simultaneously exposed to the light in a first exposure step, thereby simultaneously realizing the first exposure energy corresponding to the first area and the second exposure energy corresponding to the second area; and the third area of the surface of the interlayer insulating film is exposed to the light in a second exposure step, thereby realizing the third exposure energy corresponding to the third area.

In this embodiment, the third area is exposed to the light twice in the first and second exposure steps, and the first and second areas are exposed to the light once in the first exposure step. In this way, the first exposure energy corresponding to the first area, the second exposure energy corresponding to the second area, and the third exposure energy corresponding to the third area are realized. Therefore, an advantage that the count of the exposure steps can be decreased by one occurs. In addition, the first exposure step can be easily realized by using a single photomask having a transmitting-light attenuating film (e.g., a semi-transmissive film, a light-shielding film having minute patterns equal to or less than the limit of resolution, or the like).

In a further preferred embodiment of the method according to the second aspect of the present invention, the first, second and third areas of the surface of the interlayer insulating film are simultaneously exposed to the light in a first exposure step, thereby realizing the first exposure energy corresponding to the first area; and the second and third areas of the surface of the interlayer insulating film are simultaneously exposed to the light in a second exposure step, thereby simultaneously realizing the second exposure energy corresponding to the second area and the third exposure energy corresponding to the third area.

In this embodiment, the second and third areas are exposed to the light twice in the first and second exposure steps, and the first area is exposed to the light once in the first exposure step. In this way, the first exposure energy corresponding to the first area, the second exposure energy corresponding to the second area, and the third exposure energy corresponding to the third area are realized. Therefore, an advantage that the count of the exposure steps can be decreased by one occurs. In addition, the second exposure step can be easily realized by using a single photomask having a transmitting-light, attenuating film (e.g., a semi-transmissive film, a light-shielding film having minute patterns equal to or less than the limit of resolution, or the like).

In a still further preferred embodiment of the method according to the second aspect of the present invention, the first, second and third areas of the surface of the interlayer insulating film are simultaneously exposed to the light, thereby realizing the first exposure energy corresponding to the first area, the second exposure energy corresponding to the second area, and the third exposure energy corresponding to the third area in a single exposure step.

In this embodiment, an advantage that the count of the exposure steps can be decreased to one occurs. In addition, the said exposure step can be easily realized by using a single photomask having at least two transmitting-light attenuating films (e.g., a semi-transmissive film, a light-shielding film having minute patterns equal to or less than the limit of resolution, or the like) which are different in transmittance.

As the transparent insulative material with photosensitivity to be used for the interlayer insulating film of the LCD device according to the first aspect of the invention, a photosensitive acrylic resin (for example, PC403, 415G, 405G or the like manufactured by JSR Corporation) may be preferably used. However, any other resin than photosensitive acrylic resins or any other organic material may be used for this purpose.

As the insulative material film with photosensitivity to be used for the method of fabricating a LCD device according to the second aspect of the invention, the same material film as used in the LCD device according to the first aspect of the invention may be used.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
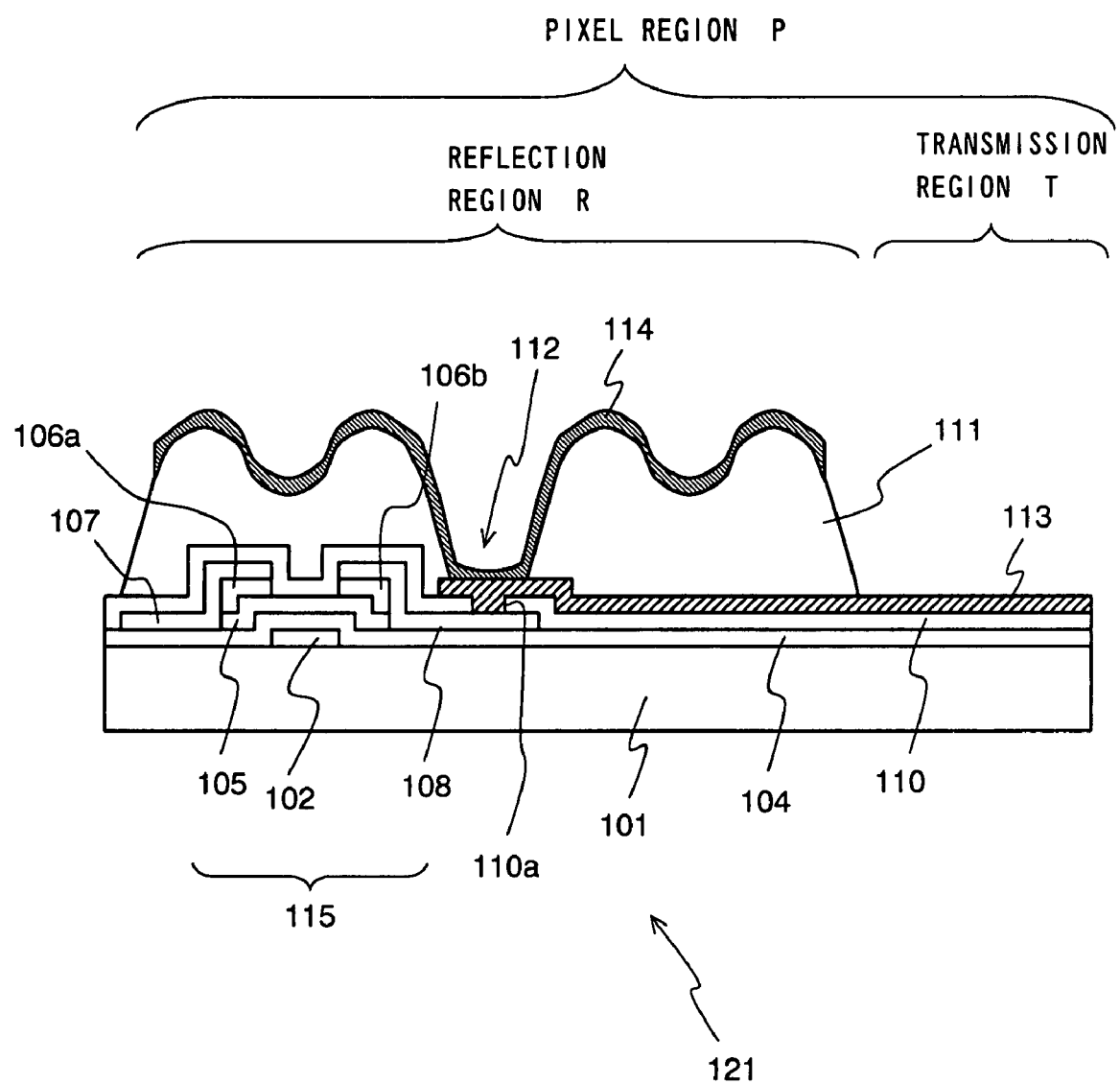
FIG. 1 is a partial cross-sectional view showing the structure of the TFT array substrate used for a prior-art semi-transmissive type LCD device.

Preferred embodiments of the present invention will be described in detail below while referring to the drawings attached.

First Embodiment

Figure 3:
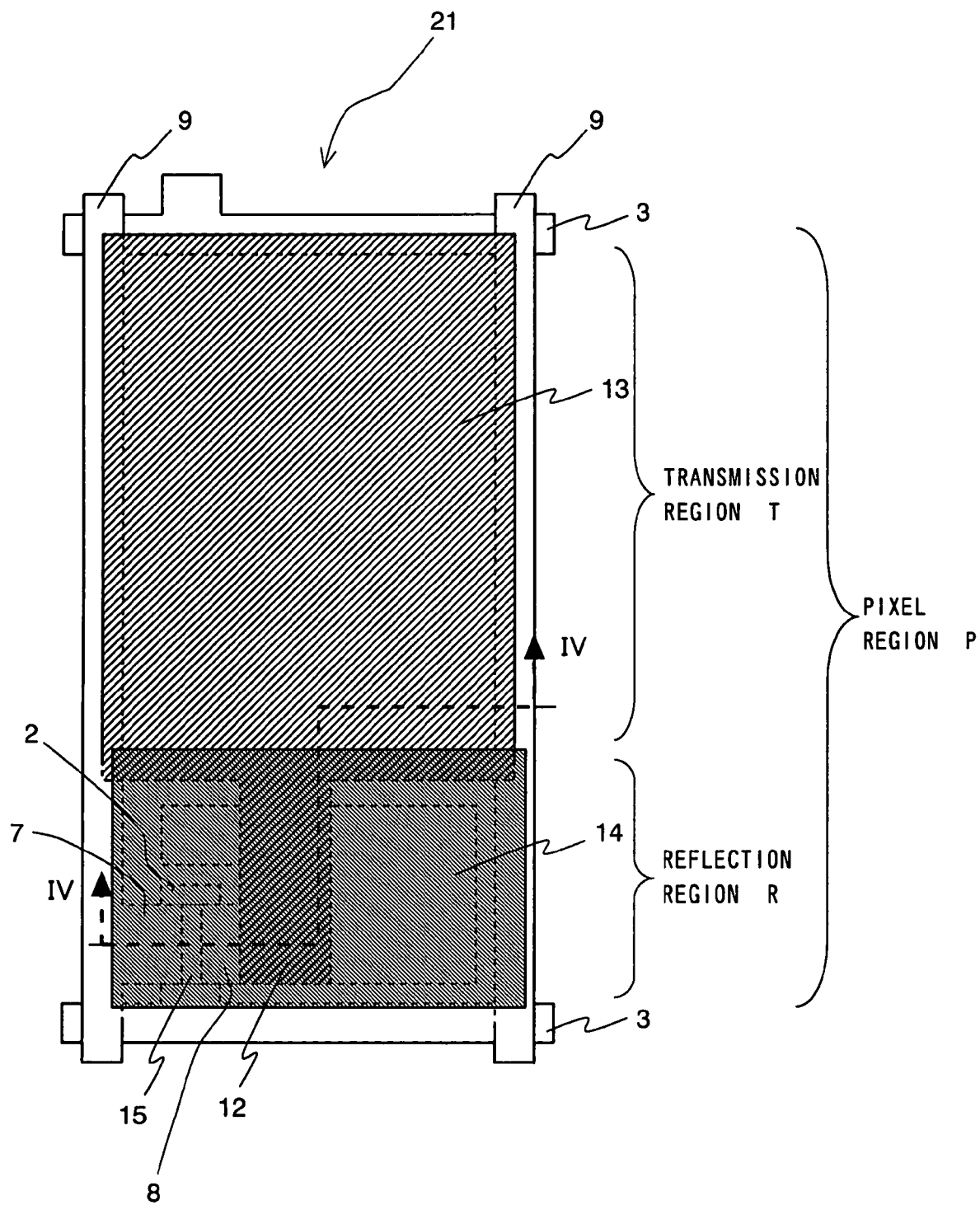
FIG. 3 is a partial plan view showing the structure of the TFT array substrate used for a semi-transmissive type LCD device according to a first embodiment of the invention.
Figure 4:
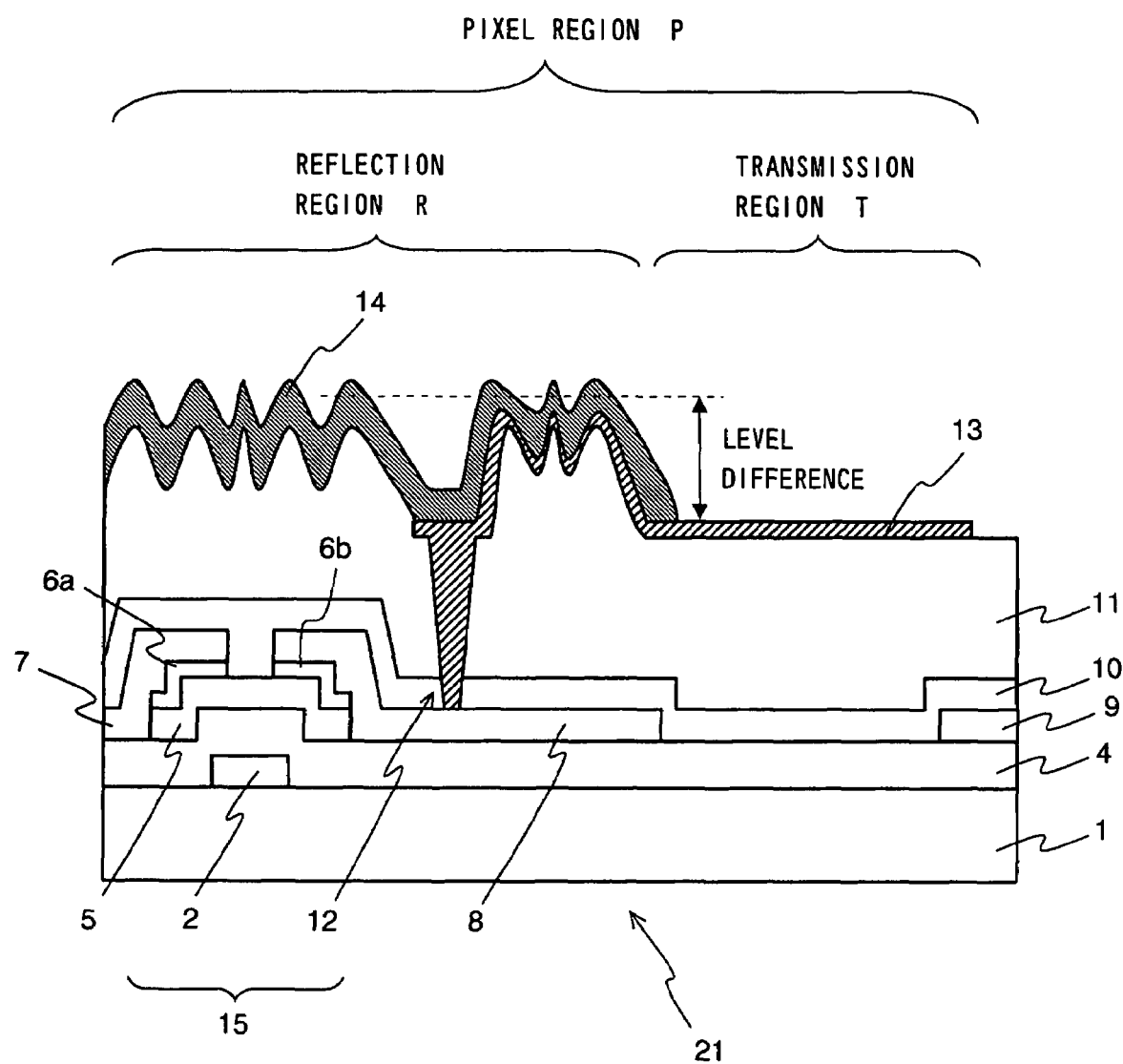
FIG. 4 is a partial cross-sectional view along the line IV-IV in FIG. 3.
Figure 5:
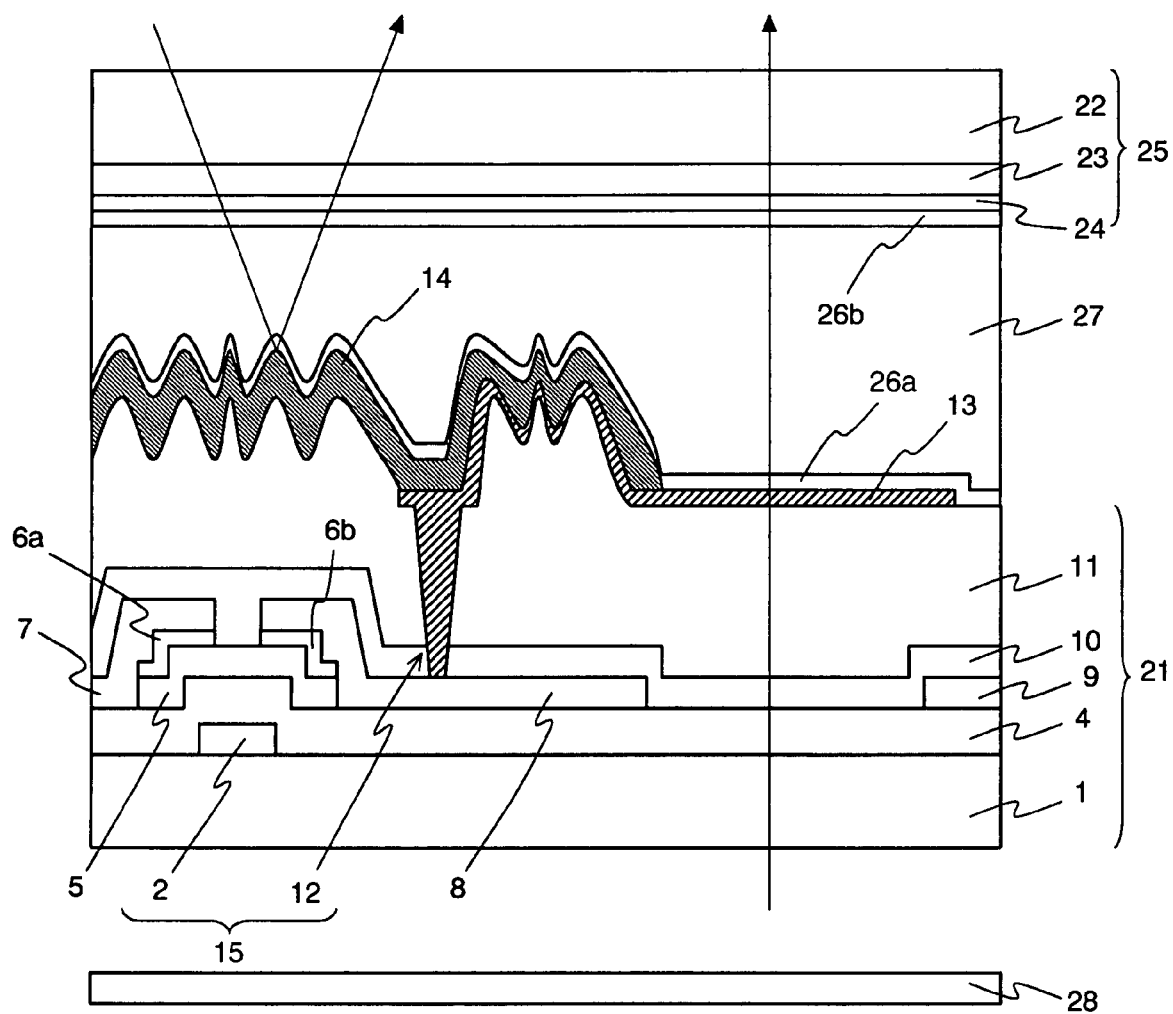
FIG. 5 is a partial cross-sectional view along the line IV-IV in FIG. 3, which shows the structure of the LCD device according to the first embodiment of the invention.

The schematic structure of the TFT array substrate used for a semi-transmissive type LCD device according to a first embodiment of the invention is shown in FIG. 3, and the cross-sectional structure thereof along the line IV-IV in FIG. 3 is shown in FIG. 4. The cross-sectional structure of the LCD device itself along the line IV-IV is shown in FIG. 5. These figures show the pixel structure of one of the pixel regions P arranged in a matrix array.

As shown in FIG. 3, with the TFT array substrate 21 used for the LCD device according to the first embodiment of the Invention, the pixel region P corresponding to one pixel is one of the rectangular regions defined by gate lines 3 extending along the horizontal direction of FIG. 3 and data lines 9 extending along the vertical direction thereof. The pixel region P is divided into a transmission region T and a reflection region R, where a transmission electrode 13 is formed in the transmission region T and a reflection electrode 14 is formed in the reflection region R. The transmission electrode 13 and the reflection electrode 14 are electrically connected to each other. Thus, the pixel electrode is constituted by the transmission electrode 13 and the reflection electrode 14.

A TFT 15, which serves as a switching element, is formed at each of the intersections of the gate lines 3 and the data lines 9. The drain electrode 8 of the TFT 15 is electrically connected to the transmission electrode 13 by way of a corresponding contact hole 12 penetrating through an interlayer insulating film 11 and a passivation film 10 (see FIG. 4). The transmission electrode 13, which has an approximately rectangular pattern, is located in the transmission region T. The contact hole 12 is located in the reflection region R; however, as shown in FIG. 3, part of the transmission electrode 13 is extended to the contact hole 12. Therefore, the transmission electrode 13 is connected to the drain electrode 8 at an end of the extended part of the electrode 13. The reflection electrode 14, which is located in the reflection region R, is overlapped with the extended part of the transmission electrode 13 and contacted therewith. In this way, the reflection and transmission electrodes 14 and 13 are electrically connected to each other.

In addition, although not shown, the source electrode 7 of the TFT 15 is electrically connected to the corresponding data line 9 and the gate electrode 2 of the TFT 15 is electrically connected to the corresponding gate line 3.

The TFT array substrate 21 has a cross-sectional structure shown in FIG. 4. Specifically, the substrate 21 comprises an insulative transparent plate (e.g., a glass plate) 1 on which the gate electrodes 2 and the gate lines 3 are formed. The gate electrodes 2 and the gate lines 3 are covered with a gate insulating film 4 formed on the plate 1. On the gate insulating film 4, island-shaped semiconductor films 5 are formed in such a way as to overlap with the corresponding gate electrodes 2. On the semiconductor films 5, pairs of island-shaped, heavily doped semiconductor films 6a and 6b are formed on the corresponding semiconductor films 5. The source electrodes 7 and the drain electrodes 8 are overlapped with the corresponding pairs of semiconductor films 6a and 6b on the gate insulating film 4, respectively. The gate electrode 2, the gate insulating film 4, the semiconductor film 5, the pair of semiconductor films 6a and 6b. the Source electrode 7 and the drain electrode 8 constitute the TFT 15. On the gate insulating film 4, the data lines 9 also are formed. The TFTs 15 and the data lines 9 are covered with the passivation film 10.

On the passivation film 10, the interlayer insulating film 11 is formed to cover both the transmission regions T and the reflection regions R. On the interlayer insulating film 11, both the transmission electrodes 13 and the reflection electrodes 14 are selectively formed. Each of the transmission electrodes 13, which is located in the corresponding one of the transmission regions T, has an approximately rectangular pattern shown in FIG. 3, and part of the transmission electrode 13 is extended to the corresponding reflection region R. Contact holes 12, which reach the corresponding drain electrodes 8 of the TFTs 15, are formed to penetrate through the interlayer insulating film 11 and the passivation film 10. The rectangular extended part of each transmission electrode 13 is electrically and mechanically connected to the corresponding drain electrode 8 by way of the corresponding contact hole 12. Each of the reflection electrodes 14, which is located in the corresponding one of the reflection regions R, has an approximately rectangular pattern shown in FIG. 3, and is overlapped with the extended part of the corresponding transmission electrode 13. Since convex and concave shapes (in other words, protrusions and depressions) are formed on the surface of the interlayer insulating film 11 in the corresponding reflection region R to enhance the reflection effect of incident light, the reflection electrode 14 has convex and concave shapes formed as a reflection of the convex and concave shapes of the film 11.

On the interlayer insulating film 11, as shown in FIG. 4, a level difference between the transmission region T and the corresponding reflection region R is formed. Specifically, the height of the surface of the transmission electrode 13 from the plate 1 in the transmission region T is less than the height of the surface of the reflection electrode 14 from the plate 1 in the reflection region R. In other words, the height of the surface of the interlayer insulating film 11 from the plate 1 in the transmission region T is less than the height of the surface of the interlayer insulating film 11 from the plate 1 in the reflection region R. In addition, since the surface of the interlayer insulating film 11 includes the convex and concave shapes or protrusions and depressions in the reflection region R, the height in the reflection region R is defined as the average height obtained by averaging the said convex and concave shapes or protrusions and depressions.

The semi-transmissive type LCD device according to the first embodiment of the invention is constituted by combining the TFT array substrate 21 having the above-described structure with an opposite or counter substrate 25 and a liquid crystal layer 27, where the liquid crystal layer 27 is sandwiched by the substrates 21 and 25, as shown in FIG. 5.

The opposite or counter substrate 25 comprises an insulative transparent plate (e.g., a glass plate) 22 on which a color filter 23 and an opposite or counter electrode 24 are formed and stacked in this order. An alignment film 26b is formed on the opposite electrode 24.

An alignment film 26a is formed on the TFT array substrate 21 to cover the transmission electrodes 13 and the reflection electrodes 14. The TFT array substrate 21 and the opposite substrate 25 are coupled together in such a way that the alignment films 26a and 26b are opposed to each other at an approximately equal gap. The liquid crystal layer 27 is disposed between the substrates 21 and 25. Polarizer plates (not shown) are attached onto the outer surfaces of the substrates 21 and 25, respectively. The structure obtained in this way constitutes a liquid-crystal display (LCD) panel. On the side of the TFT array substrate 21 of the panel, a backlight unit 28 is provided at a gap from the substrate 21.

With the semi-transmissive type LCD device according to the first embodiment of the invention having the above-described structure, the alignment direction of the liquid crystal molecules in the liquid crystal layer 27 is changed by applying signal voltages across the pixel electrodes (i.e., the transmission electrodes 13 and the reflection electrodes 14) and the opposite electrode 24, thereby displaying desired images. In the transmission mode, the images are displayed by making the light emitted from the backlight unit 28 pass through the liquid crystal layer 27. In the reflection mode, the images are displayed by making the light reflected by the reflection electrodes 14 pass through the liquid crystal layer 27. Accordingly, as clearly seen from FIG. 5, the light propagating through the liquid crystal layer 27 in the transmission and reflection modes have difference in propagation distance.

However, this LCD device comprises the level difference formed on the surface of the interlayer insulating film 11 between the transmission region T and the reflection region R, in other words, the level difference between the transmission electrode 13 and the reflection electrode 14 is formed. Therefore, the optical path lengths in the transmission and reflection modes can be equalized.

Next, a method of fabricating the TFT array substrate 21 used for the semi-transmissive type LCD device according to the first embodiment is explained below with reference to FIGS. 6 to 13.

First, a conductive film or an insulative film is formed on the transparent plate 1 such as a glass plate by a sputtering or CVD (Chemical Vapor Deposition) method and thereafter, the conductive or insulative film is patterned by photolithography and etching. These process steps are repeated necessary times, thereby forming the structure of FIG. 6.

Concretely speaking, first, a single-layer metal film made of aluminum (Al), molybdenum (Mo), or chromium (Cr) or an alloy containing one of Al, Mo and Cr as its dominant constituent, or a multiple-layered metal film formed by stacked sub-films made of at least two of these metals or alloys, is formed on the transparent plate 1. Then, the film thus formed is patterned to form the gate electrodes 2 and the gate lines 3 on the plate 1. Next, as the gate insulating film 4 that covers the gate electrodes 2 and the gate lines 3, a silicon nitride ($SiN_x$) film or a two-layered film formed by a $SiN_x$ sub-film and a silicon dioxide ($SiO_2$) sub-film stacked, is formed on the plate 1.

Figure 6:
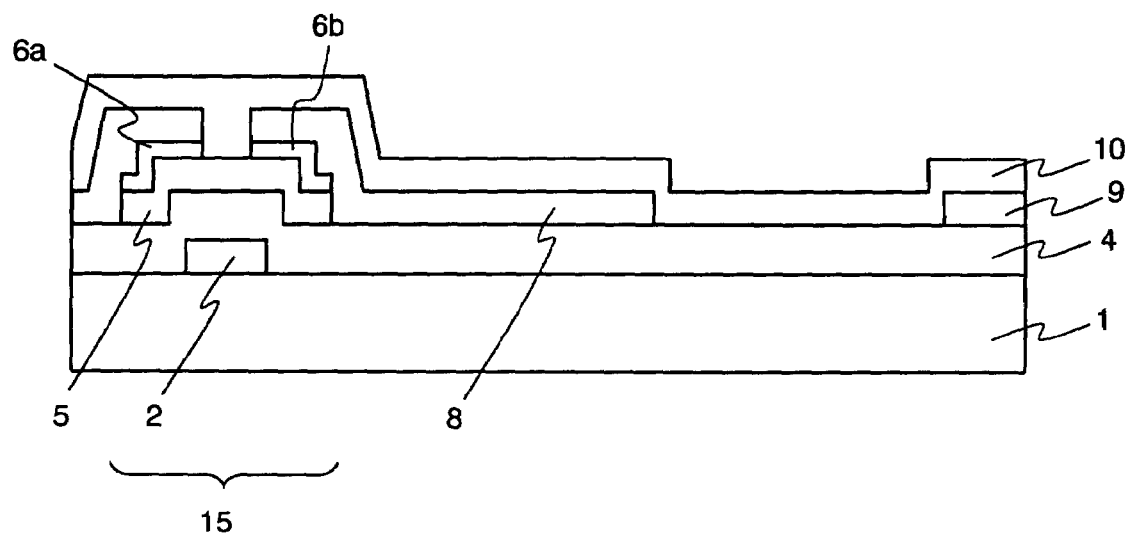
FIG. 6 is a partial cross-sectional view along the line IV-IV in FIG. 3, which shows a fabrication method of the TFT substrate used for the LCD device according to the first embodiment of the invention.

Subsequently, on the gate insulating film 4, a non-doped amorphous silicon (Si) or polycrystalline Si film is formed for the semiconductor films 5. On the non-doped amorphous or polycrystalline Si film, a heavily-doped amorphous or polycrystalline Si film with phosphorus (P) is formed on the non-doped amorphous or polycrystalline Si film. Thereafter, these two Si films are patterned to be island-shaped. On the stacked, island-shaped Si films thus formed, a metal film, which is made of Al, Mo, or Cr or an alloy containing one of Al, Mo and Cr as its dominant constituent, is formed and patterned, thereby forming the source electrodes 7, the drain electrodes 8 and the data lines 9 on the gate insulating film 4. Thereafter, using the source and drain electrodes 7 and 8 as a mask, the heavily-doped amorphous or polycrystalline Si film is patterned. In this way, the island-shaped semiconductor films 5, the pairs of island-shaped heavily-doped semiconductor films 6a and 6b, the TFTs 15 including the source and drain electrodes 7 and 8, and the data lines 9 are formed on the gate insulating film 4, as shown in FIG. 6.

Following this, as the passivation film 10, a $SiN_x$ film is formed on the gate insulating film 4, thereby covering the TFTs 15 and the data lines 9. Through the above-described process steps, the structure of FIG. 6 is obtained.

Figure 7:
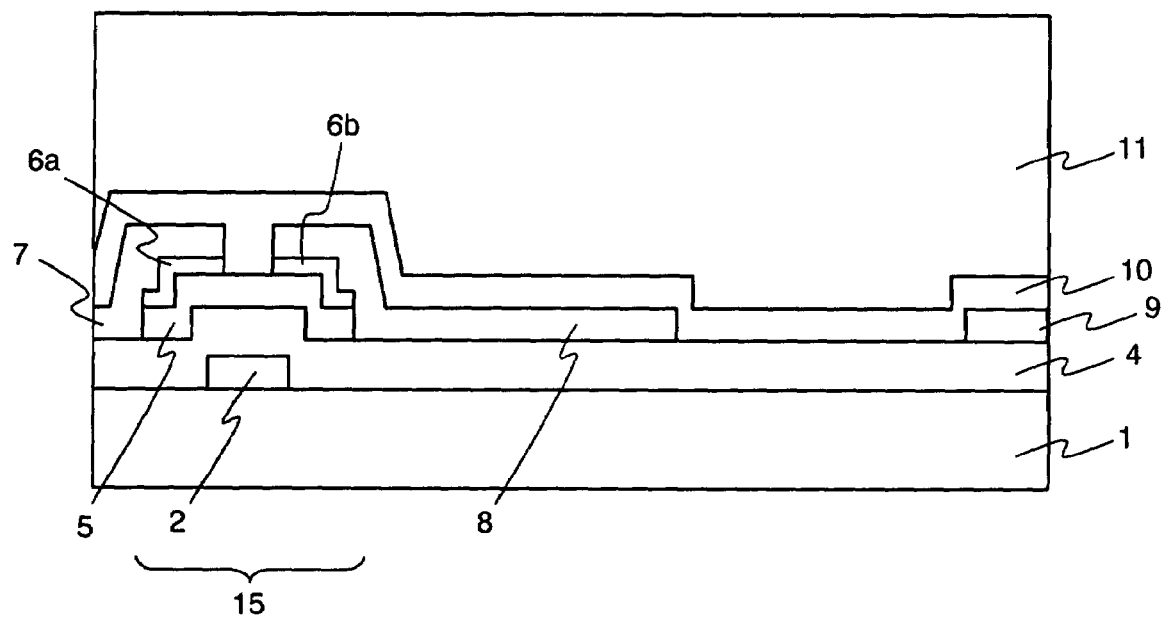
FIG. 7 is a partial cross-sectional view along the line IV-IV in FIG. 3, which shows the fabrication method of the TFT substrate used for the LCD device according to the first embodiment of the invention, which is subsequent to the step of FIG. 6.

Subsequently, as shown in FIG. 7, the interlayer insulating film 11 is formed on the passivation film 10. For example, a photosensitive acrylic resin is coated by a spin-coating method, forming an acrylic resin film as the interlayer insulating film 11. At this time, the surface of the acrylic resin film is planarized and therefore, the thickness of this film is not constant. This means that the acrylic resin film is relatively thick in the areas that do not overlap with the TFTs 15 and relatively thin in the areas that overlap with the TFTs 15.

Figure 8:
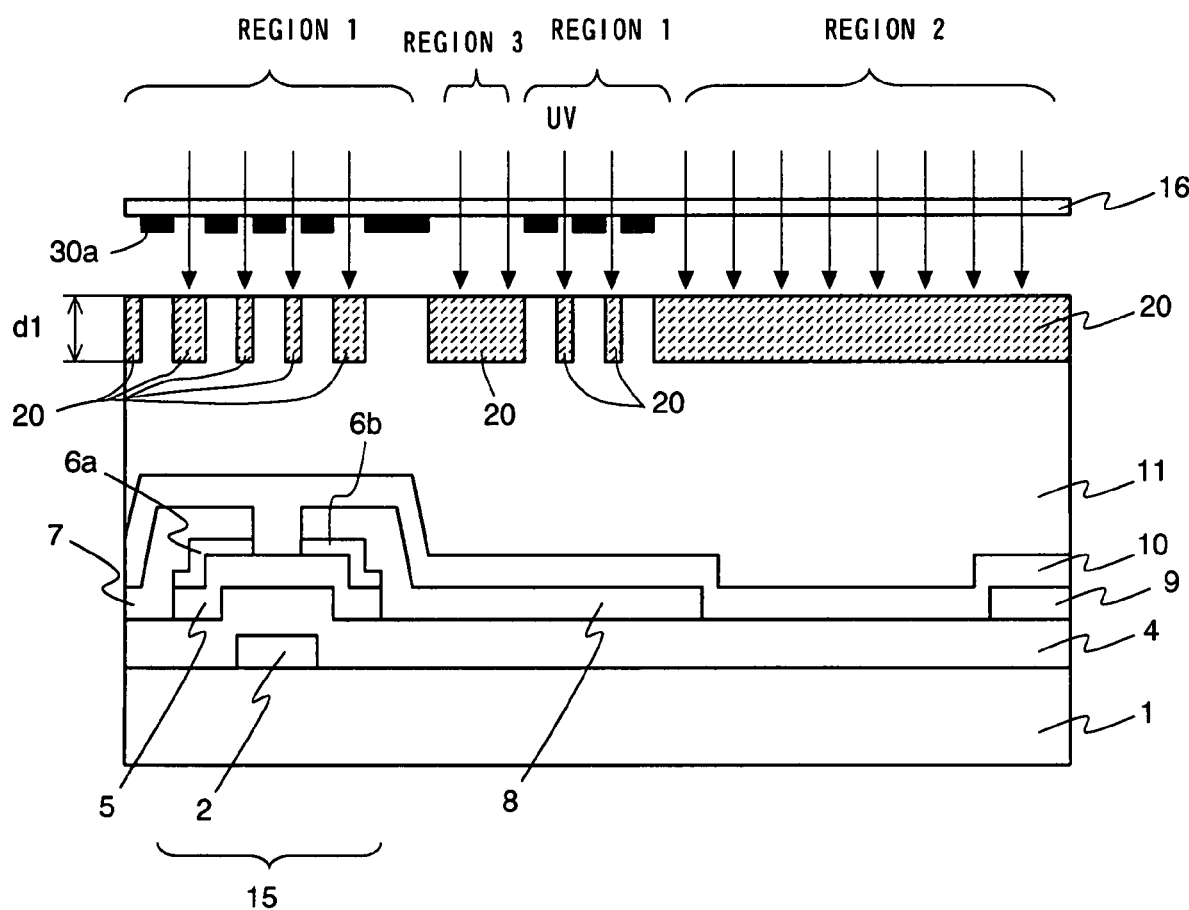
FIG. 8 is a partial cross-sectional view along the line IV-IV in FIG. 3, which shows the fabrication method of the TFT substrate used for the LCD device according to the first embodiment of the invention, which is subsequent to the step of FIG. 7.

Next, using a first photomask 16 having the pattern shown in FIG. 8, predetermined ultraviolet (UV) light is irradiated to the acrylic resin film, i.e., the interlayer insulating film 11, thereby selectively exposing the film 11. This process step is termed the "first exposure step" here.

The first photomask 16 comprises a patterned light-shielding film 30a shown in FIG. 8. The photomask 16 is divided into three parts, i.e., Region 1, Region 2, and Region 3 for each pixel region P. The film 30a shields or blocks the said UV light. The first photomask 16 transmits the said UV light in the areas where the film 30a does not exist. This means that the first photomask 16 comprises transmissible sections where the UV light is transmissible, and shielding sections where the UV light is shielded, for each pixel region P.

Region 1 of the first photomask 16 corresponds to a region where the depressions for improving the reflection effect of light are formed in the surface of the interlayer insulating film 11 in each reflection region R. Region 1 of the first photomask 16 comprises the transmissible sections and the shielding sections.

Region 2 of the first photomask 16 corresponds to a region where the unnecessary part of the interlayer insulating film 11 in each transmission region T is removed (in other words, a region where the level difference between the transmission region T and the corresponding reflection region R is formed on the surface of the interlayer insulating film 11). Region 2 of the first photomask 16 comprises the transmissible sections only.

Region 3 of the first photomask 16 corresponds to a region where the unnecessary part of the interlayer insulating film 11 is removed to form the contact hole 12. Moreover, Region 3 corresponds to a region where the unnecessary part of the interlayer insulating film 11 is removed in the area other than the display region, also. Thus, Region 3 of the first photomask 16 comprises the transmissible sections and the shielding sections.

The exposure energy of the interlayer insulating film 11 in the first exposure step is determined such that desired depressions (i.e., depressions having a desired plan shape and a desired depth) are formed at the corresponding positions to the transmissible sections in Region 1 (in the reflection region R) on the surface of the interlayer insulating film 11 after development.

After the first exposure step is completed, irradiated regions 20 are formed in the interlayer insulating film 11 at the corresponding positions to Regions 1, 2 and 3 (i.e., the transmissible sections) of the first photomask 16 for each pixel region P, as shown in FIG. 5. The irradiated regions 20 have the same plan shapes as those of the transmissible sections in Regions 1, 2 and 3 of the first photomask 16, respectively, as shown in FIG. 8. Each of the irradiated regions 20 has a depth d1 from the surface of the interlayer insulating film 11. In addition, the regions 20 may be termed the developer soluble regions because they are soluble parts in a predetermined developer solution.

Figure 9:
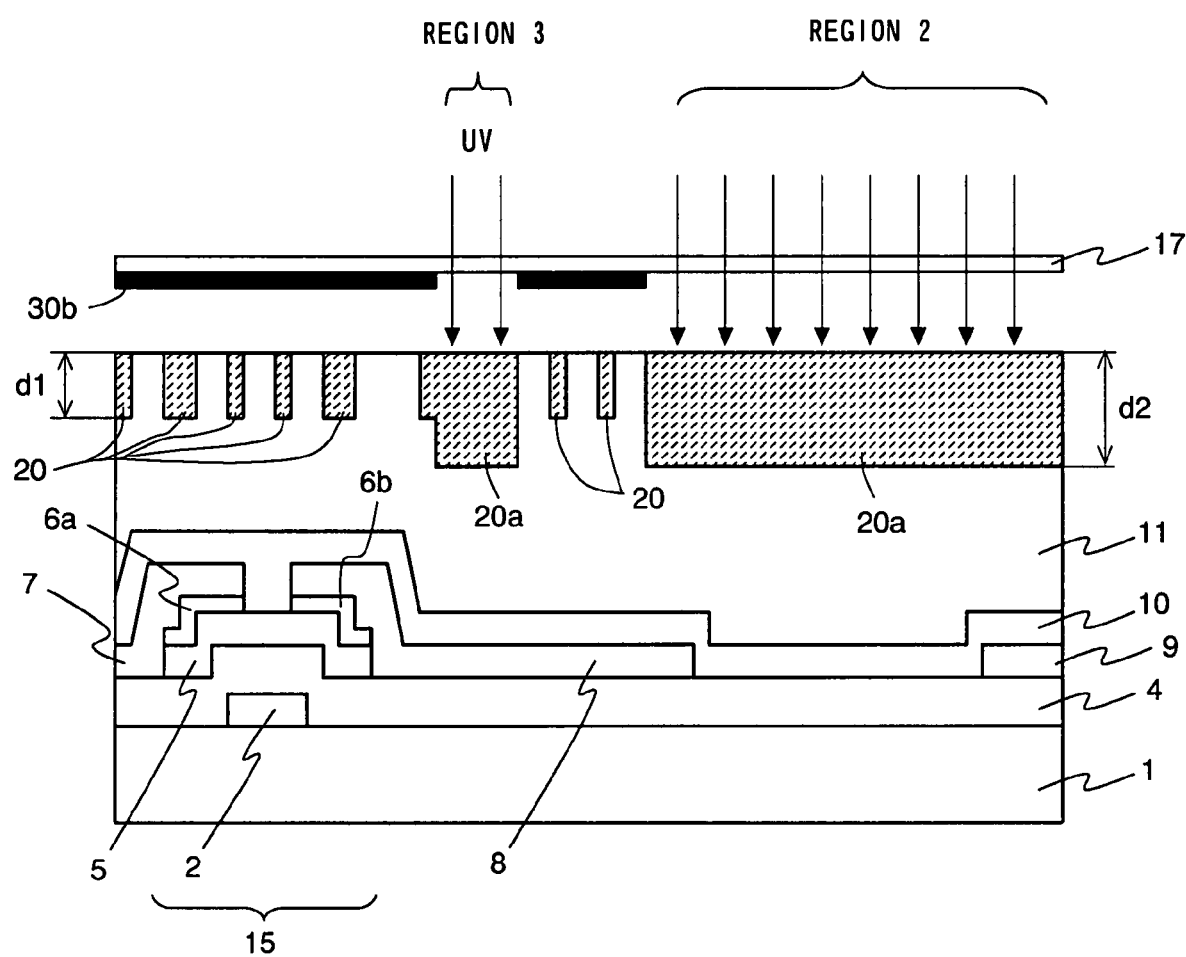
FIG. 9 is a partial cross-sectional view along the line IV-IV in FIG. 3, which shows the fabrication method of the TFT substrate used for the LCD device according to the first embodiment of the invention, which is subsequent to the step of FIG. 8.

Next, using a second photomask 17 shown in FIG. 9, predetermined UV light is irradiated to the interlayer insulating film 11 again, thereby selectively exposing the film 11. This process step is termed the "second exposure step" here.

The second photomask 17 comprises a patterned light-shielding film 30b shown in FIG. 9 and is divided into Region 1, Region 2, and Region 3 like the first photomask 16. The film 30b shields or blocks the said UV light. The second photomask 17 comprises the transmissible sections where the UV light is transmissible and the shielding sections where the UV light is shielded, because it transmits the UV light in the areas where the film 30b does not exist. The shielding section of the second photomask 17 covers whole Region 1. The transmissible sections of the second photomask 17 are formed in Region 2 and Region 3 alone. The plan shape of the transmissible section in Region 2 of the second photomask 17 is the same as that of the transmissible section in Region 2 of the first photomask 16. The plan shape of the transmissible section in Region 3 of the second photomask 17 is slightly narrower or smaller than that of the transmissible section in Region 3 of the first photomask 16.

The exposure energy of the interlayer insulating film 11 in the second exposure step is determined such that the interlayer insulating film 11 has a desired remaining thickness at the corresponding position (which is in the transmission region T) to Region 2 of the second photomask 17 after development.

After the second exposure step is completed, irradiated regions 20a are formed in the interlayer insulating film 11 at the corresponding positions to Regions 2 and 3 of the second photomask 17 for each pixel region P, as shown in FIG. 9. The irradiated regions 20a have the same plan shapes as those of the UV-light transmissible sections in Regions 2 and 3 of the second photomask 17, respectively, as shown in FIG. 9. Each of the irradiated regions 20a has a depth d2 from the surface of the interlayer insulating film 11 (d2>d1).

Figure 10:
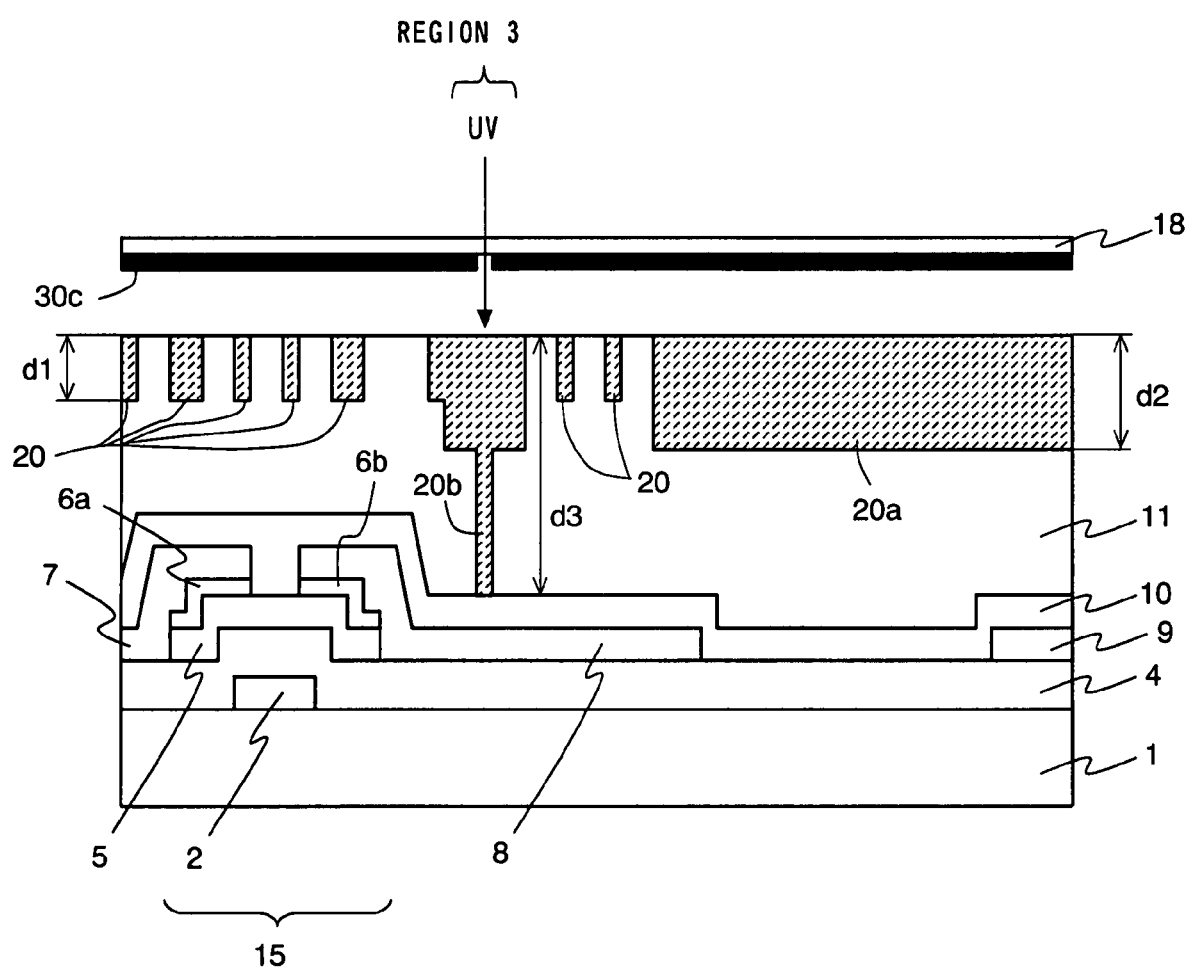
FIG. 10 is a partial cross-sectional view along the line IV-IV in FIG. 3, which shows the fabrication method of the TFT substrate used for the LCD device according to the first embodiment of the invention, which is subsequent to the step of FIG. 9.
Figure 11:
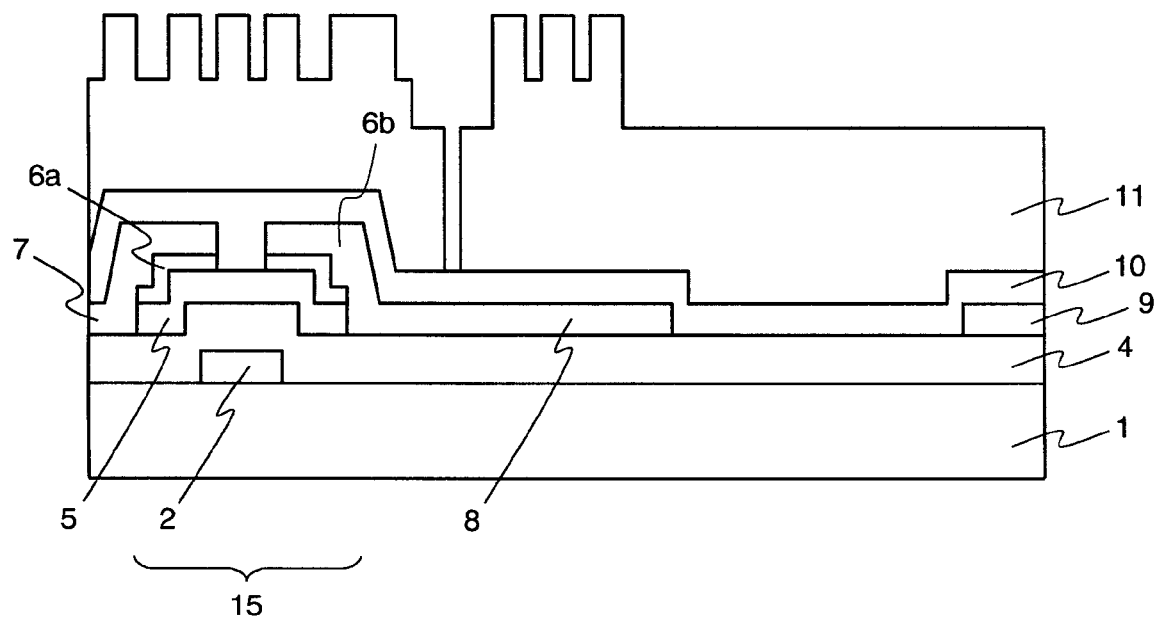
FIG. 11 is a partial cross-sectional view along the line IV-IV in FIG. 3, which shows the fabrication method of the TFT substrate used for the LCD device according to the first embodiment of the invention, which is subsequent to the step of FIG. 10.

Next, using a third photomask 18 shown in FIG. 10, predetermined UV light is irradiated to the interlayer insulating film 11, thereby selectively exposing the film 11. This process step is termed the "third exposure step" here.

The third photomask 18 comprises the patterned light-shielding film 30c shown in FIG. 10, where the film 30c is divided into Region 1. Region 2, and Region 3 like the first photomask 16. The film 30c shields or blocks the said UV light. The third photomask 18 comprises the transmissible sections where the UV light is transmissible and the shielding sections where the UV light is shielded, because it transmits the UV light in the areas where the film 30c does not exist. The shielding section of the photomask 18 covers whole Region 1 and Region 2. The transmissible section of the photomask 18 is formed in Region 3 alone. The plan shape of the transmissible section in Region 3 of the third photomask 18 at the corresponding position to the contact hole 12 is limited in the range necessary for the formation of the contact hole 12 and is considerably smaller than that of the transmissible section in Region 3 of the first photomask 16. At the unnecessary positions in the area other than the display region the plan shape of the transmissible section in Region 3 of the third photomask 18 is the same as that of the transmissible section in Region 3 of the first photomask 16.

The exposure energy of the interlayer insulating film 11 in the third exposure step is determined such that the interlayer insulating film 11 is entirely removed at the corresponding position to Region 3 (i.e., at the positions corresponding to the contact hole 12 and the unnecessary positions in the area other than the display region) of the third photomask 18 after development.

After the third exposure step is completed, an irradiated region 20b is formed in the interlayer insulating film 11 at the corresponding positions to Region 3 of the third photomask 18 for each pixel region P, as shown in FIG. 10. The irradiated region 20b has the same plan shape as the transmissible section in Region 3 of the third photomask 18, as shown in FIG. 10. In FIG. 10, only the irradiated region 20b formed at the corresponding position to the contact hole 12 is shown, and other irradiated regions 20b formed at the unnecessary positions in the area other than the display region are omitted. Each of the irradiated regions 20b has a depth d3 from the surface of the interlayer insulating film 11, where d3>d2>d1.

Figure 12:
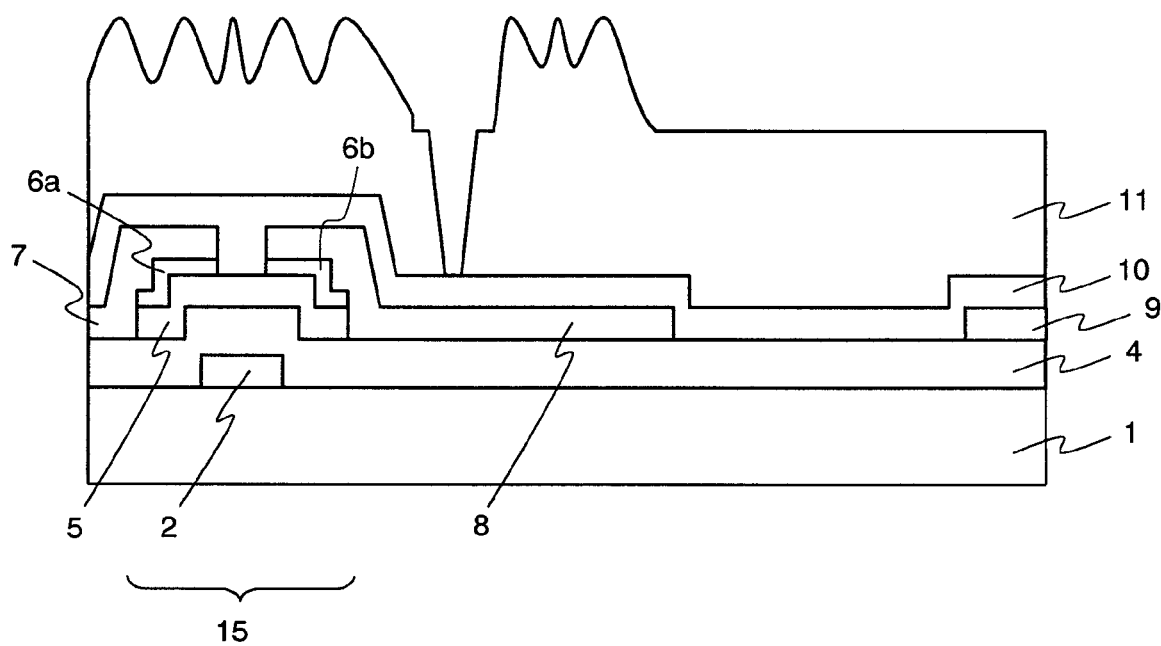
FIG. 12 is a partial cross-sectional view along the line IV-IV in FIG. 3, which shows the fabrication method of the TFT substrate used for the LCD device according to the first embodiment of the invention, which is subsequent to the step of FIG. 11.

Thereafter, the interlayer insulating film 11 is developed using a predetermined developer solution. Then, the irradiated regions 20a, 20b and 20c of the film 11 shown in FIG. 10 are selectively removed, resulting in the shape of the film 11 shown in FIG. 11. This is because the irradiated regions 20a, 20b and 20c are soluble in the developer solution. Thereafter, the remaining interlayer insulating film 11 is sintered and thermally cured. As a result, the edges of the protrusions and depressions of the surface of the film 11 are removed and rounded or smoothed, resulting in the convex and concave shapes on the surface of the film 11. Moreover, the passivation film 10 is exposed in the corresponding position to the contact hole 12. The state at this stage is shown in FIG. 12.

In addition, the order of performing the above-described first to third exposure steps is not limited to that explained here. This order may be appropriately changed to any other one. This is because the depths of the irradiated regions 20, 20a and 20b are determined by the total amount of the exposure energies and therefore, the same effect is obtainable regardless of the performing order of the first to third exposure steps.

Subsequently, to form the contact holes 12 and the openings (not shown) for the terminals or the like in the interlayer insulating film 11 having the state of FIG. 12, the passivation film 10, which is exposed from the film 11, is selectively removed by photolithography and etching.

Figure 13:
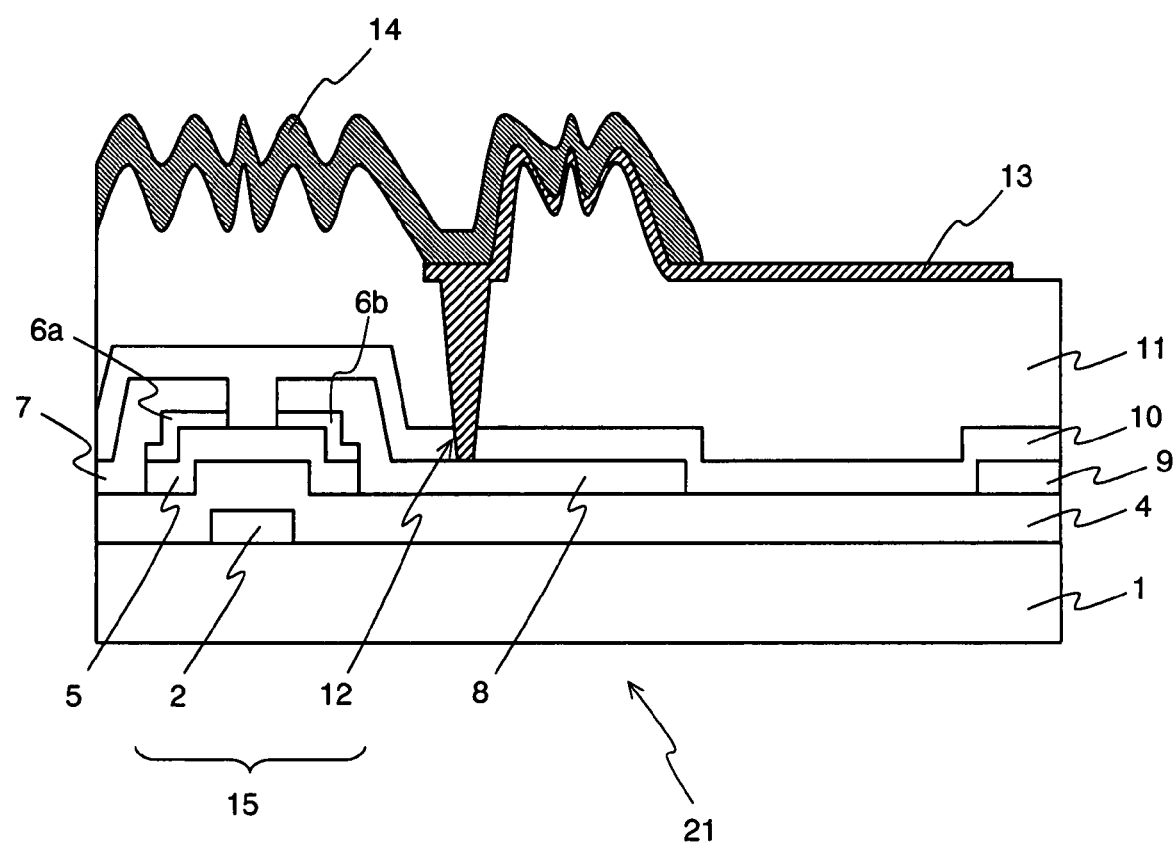
FIG. 13 is a partial cross-sectional view along the line IV-IV in FIG. 3, which shows the fabrication method of the TFT substrate used for the LCD device according to the first embodiment of the invention, which is subsequent to the step of FIG. 12.

Thereafter, a transparent conductive film such as an indium tin oxide (ITO) film is formed on the surface of the interlayer insulating film 11 and patterned, thereby forming the transmission electrodes 13 in the respective transmission regions T, as shown in FIGS. 3 and 13. At this time, the transmission electrodes 13 are contacted with the corresponding drain electrodes of the TFTs 15 by way of the corresponding contact holes 12.

Next, a conductive film such as an Al or Al alloy film is formed on the surface of the interlayer insulating film 11 and patterned, thereby forming the reflection electrodes 14 having the pattern shown in FIGS. 3 and 13 in the respective reflection regions R. Since the reflection electrodes 14 are directly overlapped with the corresponding transmission electrodes 13, the reflection electrodes 14 are electrically connected to the corresponding reflection electrodes 14 at their overlapped parts, respectively.

Each of the reflection electrodes 14 has convex and concave shapes formed as a reflection of the convex and concave shapes of the surface of the interlayer insulating film 11. The convex and concave shapes are distributed in the entire reflection electrode 14. Similar convex and concave shapes are formed in the overlapped parts of the transmission and reflection electrodes 13 and 14 also.

In addition, when the transmission electrodes 13 are formed by an ITO film and the reflection electrodes 14 are formed by an Al or Al alloy film, it is preferred that the transmission electrodes 13 are not directly contacted with the reflection electrodes 14. Therefore, in this case, it is preferred that a conductive film such as a Mo, Mo alloy or Cr film is additionally formed below the Al or Al alloy film for the reflection electrodes 14, thereby making the reflection electrodes 14 each having a two-layer structure of the Al film and the conductive film (i.e., the Mo, Mo alloy or Cr film).

Through the above-described process steps, the TFT array substrate 21 having the structure shown in FIGS. 3 and 4 is obtained. Following this, coupling the TFT array substrate 21 and the opposite substrate 25, filling the liquid crystal into the gap between the substrates 21 and 25, sealing the liquid crystal thus filled, and so on are carried out, resulting in the LCD panel. Thereafter, the backlight unit 28 is built in the panel. In this way, the semi-transmissive type LCD device according to the first embodiment having the structure shown in FIG. 5 is fabricated.

With the semi-transmissive type LCD device according to the first embodiment of the invention, as explained above, the interlayer insulating film 11, which is formed on the TFT array substrate 21, covers the transmission region T and the reflection region R in each of the pixel regions P. Moreover, the level difference between the transmission and reflection regions T and R in each pixel region P is formed. The magnitude or value of the level difference is easily changeable by changing the exposure energies for above-described Regions 1, 2 and 3 in the first to third exposure steps to thereby adjust the removing amount (removing depth) of the interlayer insulating film 11 from its surface in the transmission regions T and that in the reflection regions R. Accordingly, both the reflection characteristic (reflection mode) and the transmission characteristic (transmission mode) are easily optimized.

Figure 2:
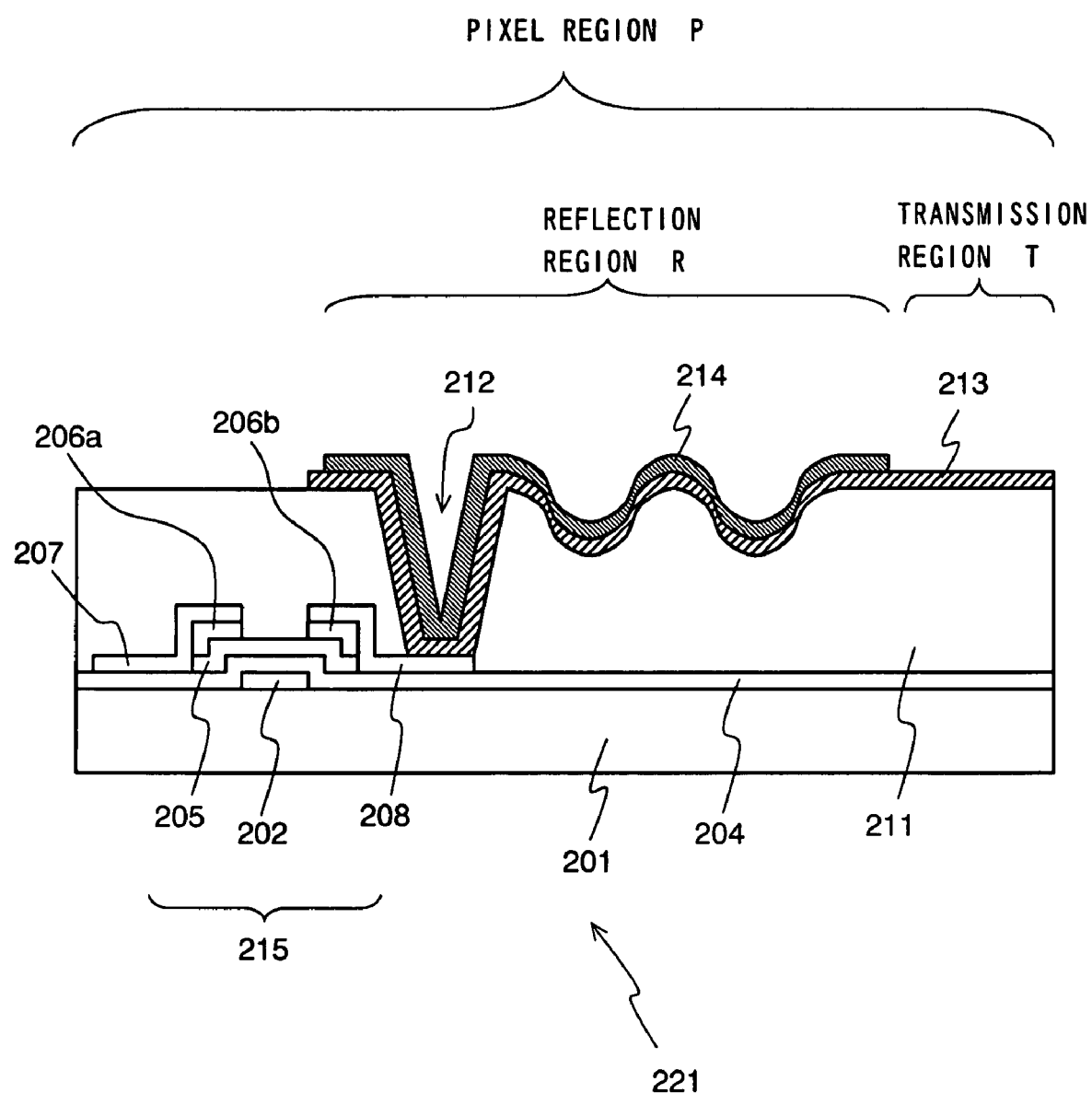
FIG. 2 is a partial cross-sectional view showing the structure of the TFT array substrate used for another prior-art semi-transmissive type LCD device.

On the other hand since the interlayer insulating film 11 covers both the transmission regions T and the reflection regions R, the pixel electrodes (i.e., the transmission electrodes 13 and the reflection electrodes 14) may be extended to overlap with the wiring lines formed in the peripheral area of the pixel electrodes. Therefore, a high aperture ratio similar to the prior-art semi-transmissive LCD device shown in FIG. 2 is obtainable.

In this way, both the reflection characteristic (reflection mode) and the transmission characteristic (transmission mode) can be easily optimized while keeping the high aperture ratio and as a result, the display quality is easily improved.

Moreover, the interlayer insulating film 11 is not entirely removed through the first to third exposure steps except for the contact holes 12 and the openings for the terminals or the like. Therefore, the phenomenon that the shape of the stage of the exposure apparatus is transferred to the interlayer insulating film 11 due to the effect of the reflected light by the said stage in these exposure steps is prevented.

In addition, the level difference of the interlayer insulating film 11 between the transmission region T and the reflection region R may be formed by increasing the thickness of the reflection electrodes 14 while keeping the thickness of the interlayer insulating film 11 constant as well. In this case, however there is an anxiety that cracks occur in the reflection electrodes 14 due to the stress of the conductive film for the reflection electrodes 14 and/or that the reflectance of the reflection electrodes 14 degrades due to the rising of the film-formation temperature. Moreover, there is a disadvantage that the load to the film formation apparatus becomes large in accordance with the thickness of the reflection electrodes 14.

On the contrary, in the LCD device according to the first embodiment where the level difference is obtained by adjusting the thickness difference of the interlayer insulating film 11 in the transmission region T and the reflection region A, such the anxiety and the disadvantage as above do not occur. Thus, the device according to the first embodiment is preferred.

Second Embodiment

Figure 14:
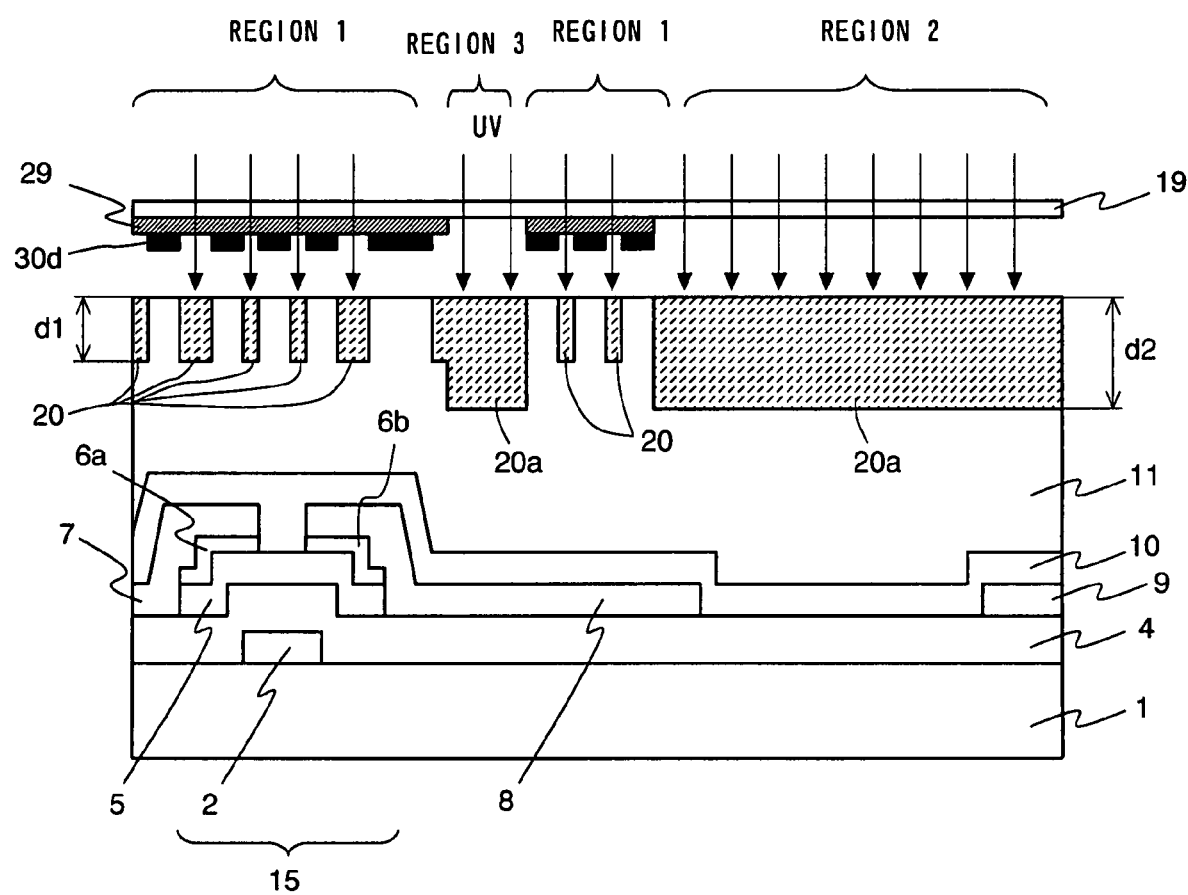
FIG. 14 is a partial cross-sectional view along the line IV-IV in FIG. 3, which shows a fabrication method of the TFT substrate used for a LCD device according to a second embodiment of the invention.
Figure 15:
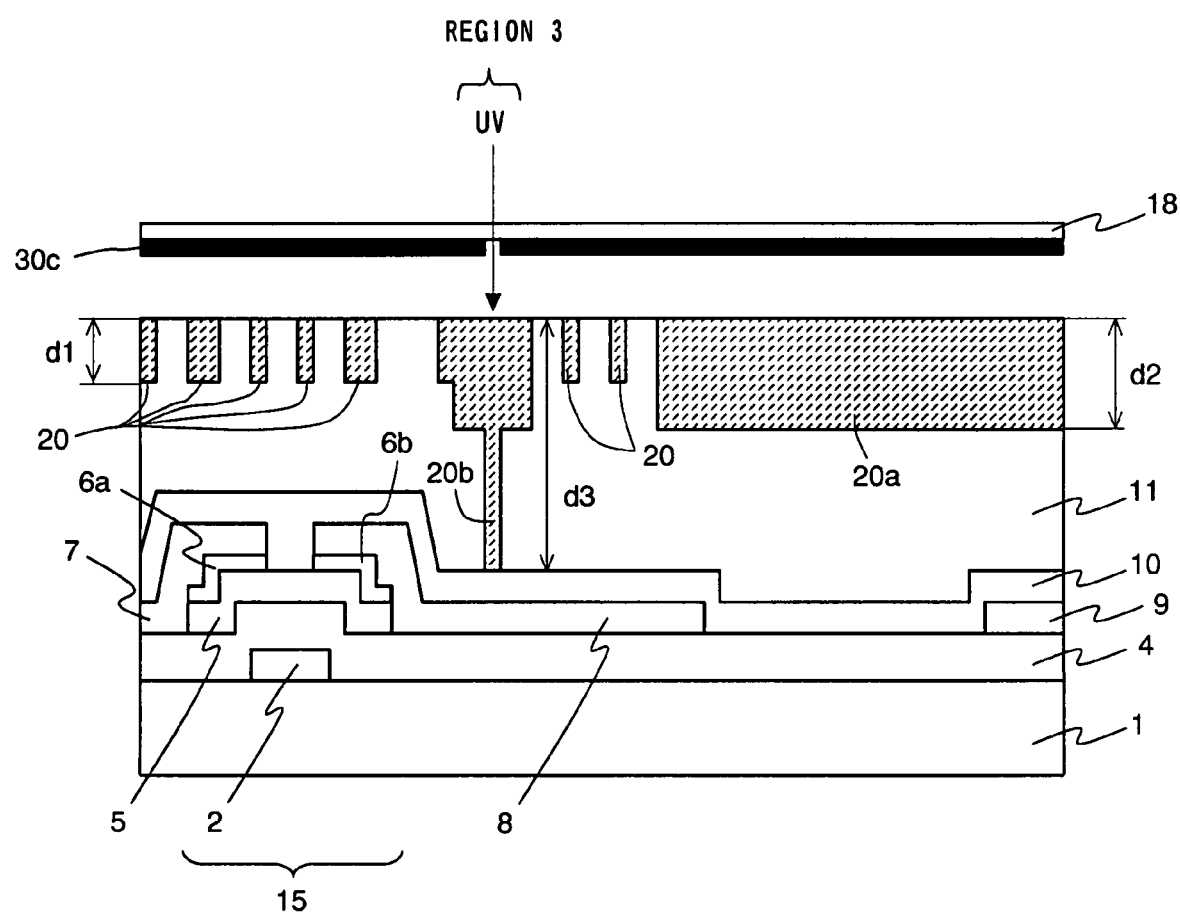
FIG. 15 is a partial cross-sectional view along the line IV-IV in FIG. 3, which shows the fabrication method of the TFT substrate used for the LCD device according to the second embodiment of the invention, which is subsequent to the step of FIG. 14.

FIGS. 14 to 15 are partial cross-sectional views along the line IV-IV in FIG. 3, which show the fabrication process steps of the TFT array substrate used for a semi-transmissive type LCD device according to a second embodiment of the invention, respectively. Each of these figures relates to one of the pixel regions P.

With the method of fabricating the semi-transmissive type LCD device according to the first embodiment of the invention, as explained above, the interlayer insulating film 11 is exposed through the first to third exposure steps. This means that the exposure steps are carried out three times while changing the photomasks. Unlike this, with the method of fabricating the LCD device according to the second embodiment, the count of the necessary exposure steps can be decreased to two.

First, in the same manner as that of the first embodiment, a photosensitive acrylic resin film as the interlayer insulating film 11 is formed on the passivation film 10 by a spin-coating method, thereby forming the structure of FIG. 7.

Next, using a first photomask 19 having the pattern shown in FIG. 14, predetermined UV light is irradiated to the acrylic resin film, i.e., the interlayer insulating film 11, thereby selectively exposing the film 11 (the first exposure step).

The first photomask 19 comprises a patterned semi-transmissive film 29 and a patterned light-shielding film 30d shown in FIG. 14, where the photomask 19 is divided into three parts, i.e., Region 1, Region 2, and Region 3 for each pixel region P. The semi-transmissive film 29 partially transmits the said UV light. The light-shielding film 30d shields or blocks the said UV light. The first photomask 19 transmits almost entirely or partially the said UV light in the areas where the film 30d does not exist. This means that the first photomask 19 comprises transmissible sections where almost all the UV light is transmissible, shielding sections where the UV light is shielded, and the semi-transmissive (or, attenuated) sections where the UV light is partially transmissible or attenuated, for each pixel region P.

Regions 1, 2 and 3 of the first photomask 19 are defined in the same way as those of the first photomask 16 (see FIG. 8) used in the first embodiment, respectively.

The exposure energy of the interlayer insulating film 11 in the first exposure step is determined such that the interlayer insulating film 11 has a desired remaining thickness at the corresponding position (which is in the transmission region T) to Region 2 (i.e., the transmissible section) of the first photomask 19 after development.

Moreover, the amount or value of the attenuated UV light, which has been penetrated through the semi-transmissive film 29, is determined in the following way. Specifically, it is determined such that desired depressions (i.e., depressions having a desired plan shape and a desired depth) are formed at the corresponding positions (in the reflection region R) to Region 1 (i.e., the semi-transmissible or attenuated sections) of the first photomask 19 on the surface of the interlayer insulating film 11 after development.

Due to the first exposure step, irradiated regions 20a are formed in the interlayer insulating film 11 at the corresponding positions to the transmissible sections in Regions 2 and 3 of the first photomask 19 for each pixel region P, as shown in FIG. 14. At the same time, irradiated regions 20 are formed in the interlayer insulating film 11 at the corresponding positions to the semi-transmissible sections in Region 1 of the first photomask 19 for each pixel region P, as shown in FIG. 14. The irradiated regions 20a have the same plan shapes as those of the transmissible sections in Regions 2 and 3 of the first photomask 16, respectively. The irradiated regions 20 have the same plan shapes as those of the semi-transmissible sections in Region 1 of the first photomask 16, respectively. Each of the irradiated regions 20 has a depth d1 from the surface of the interlayer insulating film 11. Each of the irradiated regions 20a has a depth d2 from the surface of the film 11, where d2>d1.

The first exposure step in the second embodiment corresponds to the combination of the first and second exposure steps in the first embodiment.

Next, using the third photomask 18 used in the first embodiment (see FIG. 10), predetermined UV light is irradiated to the interlayer insulating film 11 again, thereby selectively exposing the film 11 (the second exposure step). The exposure energy is the same as that used for the third exposure step in the first embodiment.

After the second exposure step is completed, an irradiated region 20b is formed in the interlayer insulating film 11 at the corresponding position to the transmissible section in Region 3 of the third photomask 18 for each pixel region P as shown in FIG. 15. The irradiated region 20b has the same plan shape as the transmissible section in Region 3 of the third photomask 18. In FIG. 15, only the irradiated region 20b formed at the corresponding position to the contact hole 12 is shown, and other irradiated regions 20b formed at the unnecessary positions in the area other than the display region are omitted. Each of the irradiated regions 20b has a depth d3 from the surface of the interlayer insulating film 11, where d3>d2.

The subsequent process steps are the same as those of the first embodiment.

With the semi-transmissive LCD device according to the second embodiment of the invention, obviously, the same advantages as those of the first embodiment are obtainable. In addition, another advantage that the irradiated regions 20, 20a and 20b can be formed in the interlayer insulating film 11 as desired through two exposure steps (which is less than that of the first embodiment by one) is obtainable.

The order of performing the above-described first and second exposure steps may be opposite, in other words, the above-described second exposure step may be performed first and thereafter, the above-described first exposure step may be performed in the second embodiment. Instead of the semi-transmissive film 29, a light-shielding film having minute patterns equal to or less than the limit of resolution may be used.

Third Embodiment

Figure 16:
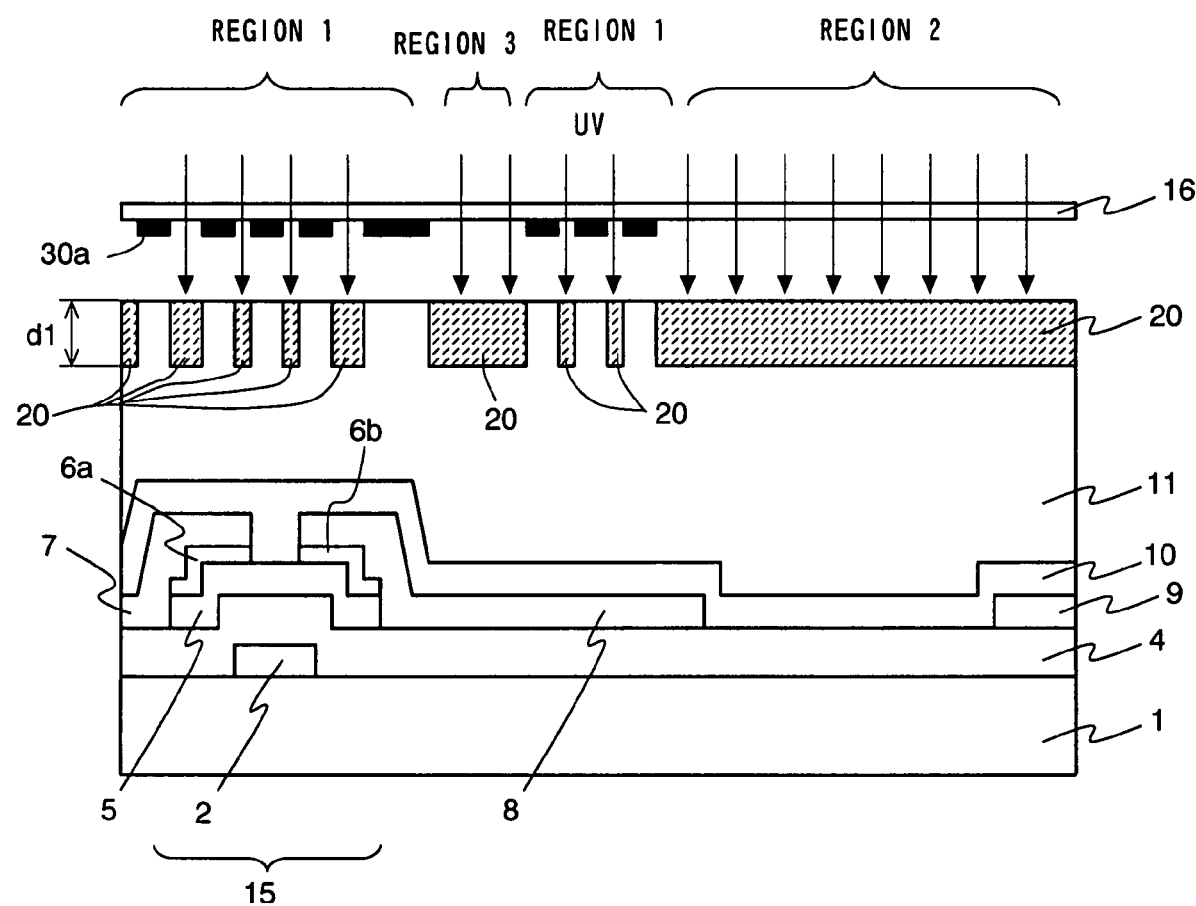
FIG. 16 is a partial cross-sectional view along the line IV-IV in FIG. 3, which shows a fabrication method of the TFT substrate used for a LCD device according to a third embodiment of the invention.
Figure 17:
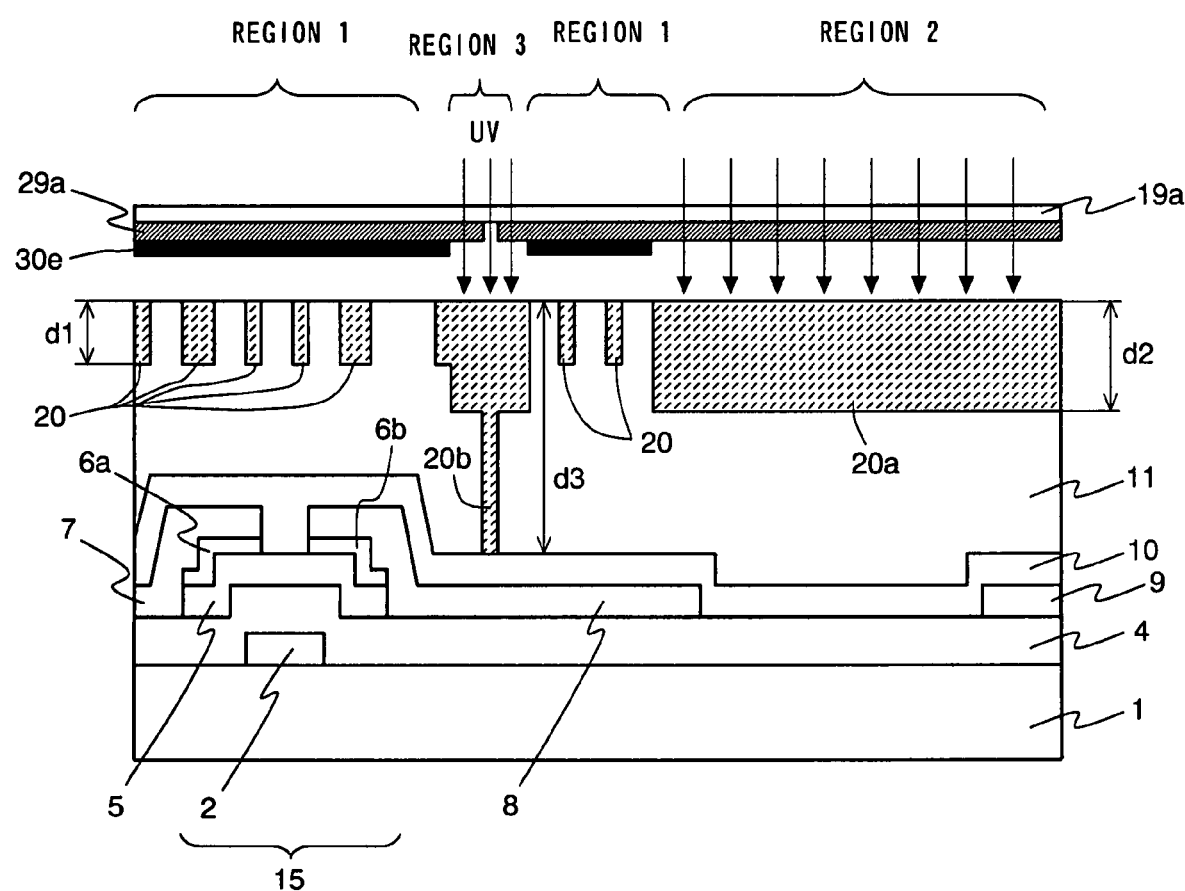
FIG. 17 is a partial cross-sectional view along the line IV-IV in FIG. 3, which shows the fabrication method of the TFT substrate used for the LCD device according to the third embodiment of the invention, which is subsequent to the step of FIG. 16.

FIGS. 16 to 17 are partial cross-sectional views along the line IV-IV in FIG. 3, which show the fabrication process steps of the TFT array substrate used for a semi-transmissive type LCD device according to a third embodiment of the invention, respectively. Each of these figures relates to one of the pixel regions P.

In the method of fabricating the device of the third embodiment also, the count of the above-described necessary exposure steps can be reduced to two.

First, in the same manner as that of the first embodiment, a photosensitive acrylic resin film as the interlayer insulating film 11 is formed on the passivation film 10 by a spin-coating method, thereby forming the structure of FIG. 7.

Next, using the first photomask 16 used in the first exposure step in the first embodiment (see FIG. 8), predetermined UV light is irradiated to the acrylic resin film, i.e., the interlayer insulating film 11, thereby selectively exposing the film 11 (the first exposure step).

The exposure energy of the interlayer insulating film 11 in the first exposure step is determined such that desired depressions (i.e., depressions having a desired plan shape and a desired depth) are formed at the corresponding positions to the transmissible sections in Region 1 (in the reflection region R) on the surface of the interlayer insulating film 11 after development. This exposure energy is the same as that of the first embodiment.

Due to the first exposure step, irradiated regions 20 are formed in the interlayer insulating film 11 at the corresponding positions to the transmissible sections in Regions 1, 2 and 3 of the first photomask 16 for each pixel region P, as shown in FIG. 16. The irradiated regions 20 have the same plan shapes as those of the transmissible sections in Regions 1, 2 and 3 of the first photomask 16, respectively. Each of the irradiated regions 20 has a depth d1 from the surface of the interlayer insulating film 11.

Next, using a second photomask 19a having the pattern shown in FIG. 17, predetermined UV light is irradiated to the acrylic resin film, i.e., the interlayer insulating film 11, thereby selectively exposing the film 11 (the second exposure step).

The second photomask 19a comprises a patterned semi-transmissive film 29a and a patterned light-shielding film 30e as shown in FIG. 17. The semi-transmissive film 29a partially transmits the said UV light. The light-shielding film 30e shields the said UV light. The second photomask 19a transmits almost entirely or partially the said UV light in the areas where the film 30e does not exist. This means that the second photomask 19a comprises a transmissible section where almost all the UV light is transmissible, shielding sections where the UV light is shielded, and the semi-transmissible (or, attenuated) sections where the UV light is partially transmissible or attenuated, for each pixel region P.

The exposure energy of the interlayer insulating film 11 in the second exposure step is determined such that the interlayer insulating film 11 is completely removed at the corresponding position to the transmissible section in Region 3 of the second photomask 19a after development, thereby forming the contact hole 12.

Moreover, the amount or value of the attenuated UV light, which has been penetrated through the semi-transmissive film 29a, is determined such that the interlayer insulating film 11 has a desired remaining thickness at the corresponding position (which is in the transmission region T) to Region 2 (i.e., the transmissible section) of the second photomask 19a after development.

Due to the second exposure step, irradiated regions 20a and 20b are formed in the interlayer insulating, film 11 at the corresponding positions to the semi-transmissible sections in Regions 2 and 3 of the second photomask 19a for each pixel region P, as shown in FIG. 17. The irradiated regions 20a has the same plan shapes as those of the semitransmissible sections in Regions 2 and 3 of the second photomask 19a. The irradiated region 20b has the same plan shape as that of the transmissible section in Region 3 of the second photomask 19a. Each of the irradiated regions 20a has a depth d2 from the surface of the interlayer insulating film 11. Each of the irradiated regions 20b has a depth d3 from the surface of the film 11, where d3>d2>d1.

The second exposure step in the third embodiment corresponds to the combination of the second and third exposure steps in the first embodiment.

The subsequent process steps are the same as those of the first embodiment.

With the semi-transmissive LCD device according to the third embodiment of the invention, obviously, the same advantages as those of the first embodiment are obtainable. In addition, another advantage that the irradiated regions 20, 20a and 20b can be formed in the interlayer insulating film 11 as desired through two exposure steps (which is less than that of the first embodiment by one) is obtainable.

The order of performing the above-described first and second exposure steps may be opposite, in other words, the above-described second exposure step may be performed first and thereafter, the above-described first exposure step may be performed. Instead of the semi-transmissive film 29a, a light-shielding film having minute patterns equal to or less than the limit of resolution may be used.

Fourth Embodiment

Figure 18:
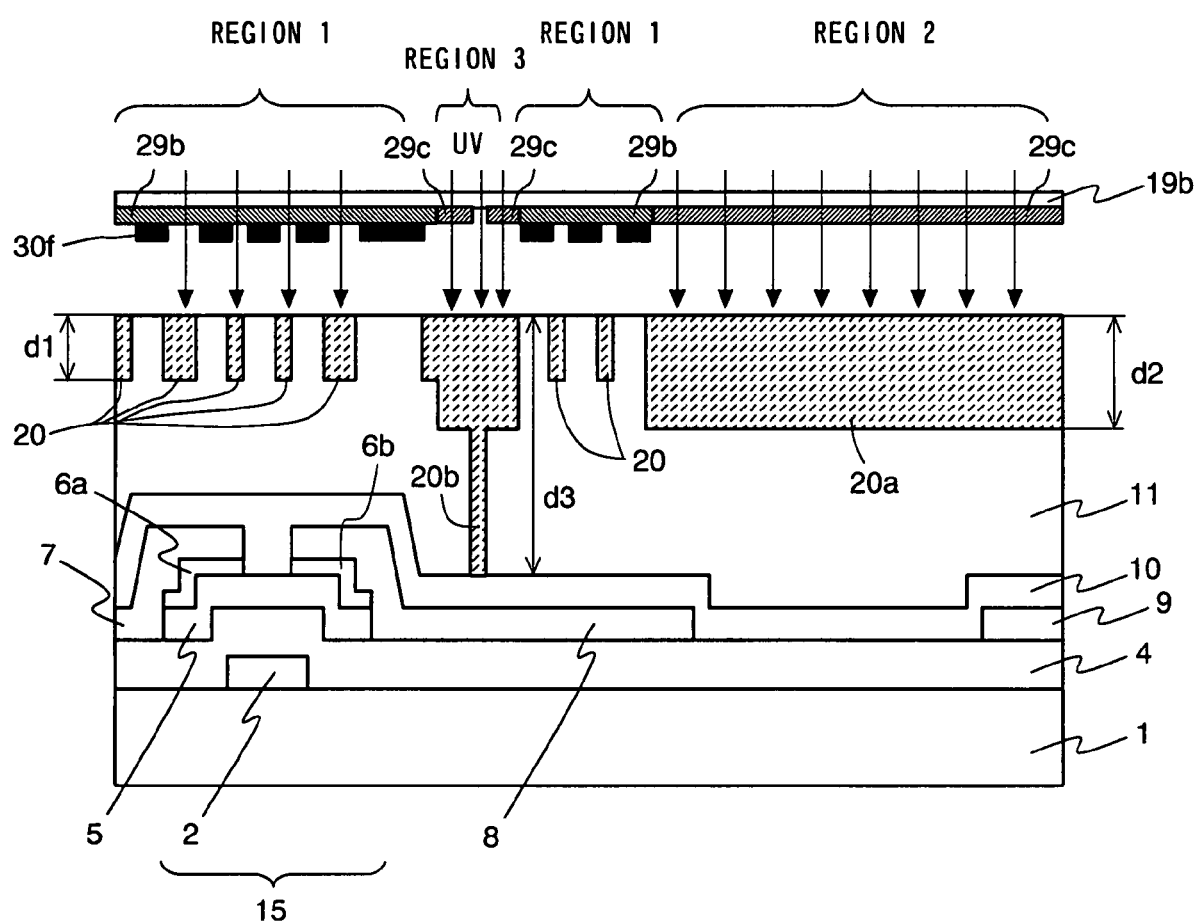
FIG. 18 is a partial cross-sectional view along the line IV-IV in FIG. 3, which shows a fabrication method of the TFT substrate used for a LCD device according to a fourth embodiment of the invention.

FIG. 18 is a partial cross-sectional view along the line IV-IV in FIG. 3, which shows the fabrication process steps of the TFT array substrate used for a semi-transmissive type LCD device according to a fourth embodiment of the invention. This figure relates to one of the pixel regions P.

In the method of fabricating the device of the fourth embodiment, the count of the above-described necessary exposure steps can be reduced to one.

In the fabrication method of the fourth embodiment, using a photomask 19b shown in FIG. 18, predetermined UV light is irradiated to the acrylic resin film, i.e., the interlayer insulating film 11, thereby selectively exposing the film 11.

The photomask 19b comprises two patterned semi-transmissive films 29b and 29c having different UV-light transmittances and a patterned light-shielding film 30f as shown in FIG. 18. Both the semi-transmissive films 29b and 29c partially transmit the said UV light: however, the UV-light transmittance of the film 29c is greater than that of the film 29b. The light-shielding film 30f shields the said UV light. The photomask 19b transmits almost entirely or partially the said UV light in the areas where the film 30f do not exist. This means that the photomask 19b comprises a transmissible section where almost all the UV light is transmissible, shielding sections where the UV light is shielded, semi-transmissible (or, attenuated) sections where the UV light is partially transmissible at a relatively lower transmittance, and semi-transmissible (or, attenuated) sections where the UV light is partially transmissible at a relatively higher transmittance, for each pixel region P.

Region 1 comprises the shielding sections and the semi-transmissible sections having a relatively lower transmittance. Region 2 comprises the semi-transmissible sections having a relatively higher transmittance. Region 3 comprises the transmissible section and the semi-transmissible section having a relatively higher transmittance.

The exposure energy of the interlayer insulating film in the said exposure step is determined such that the interlayer insulating film 11 is completely removed at the corresponding position to the transmissible section in Region 3 of the photomask 19b after development, thereby forming the contact hole 12.

The amount or value of the attenuated UV light, which has been penetrated through the semi-transmissive film 29b having a relatively lower transmittance, is determined such that desired depressions are formed at the corresponding positions to the semi-transmissible sections in Region 1 on the surface of the interlayer insulating film 11 after development.

The amount or value of the attenuated UV light, which has been penetrated through the semi-transmissive film 29c having a relatively higher transmittance, is determined such that the interlayer insulating film 11 has a desired remaining thickness at the corresponding positions to the semi-transmissible sections in Regions 2 and 3 after development.

Due to the said exposure step, irradiated regions 20, 20a and 20b are formed in the interlayer insulating film 11 at the corresponding positions to Regions 1, 2 and 3 for each pixel region P, as shown in FIG. 18. The irradiated regions 20 have the same plan shapes as those of the semi-transmissible sections having the relatively lower transmittance (i.e., the semi-transmissive film 29b and the light-shielding film 30f) in Region 1 of the photomask 19b, respectively. The irradiated regions 20a have the same plan shapes as those of the semi-transmissible sections having the relatively higher transmittance (i.e., the semi-transmissive film 29c) in Regions 2 and 3 of the photomask 19b, respectively. The irradiated region 20b has the same plan shape as that of the transmissible section (where none of the light-shielding film 30f and the semi-transmissive films 29b and 29c is present) in Region 3 of the second photomask 19a.

Each of the irradiated regions 20 has a depth d1 from the surface of the interlayer insulating film 11. Each of the irradiated regions 20a has a depth d2 from the surface of the interlayer insulating film 11. Each of the irradiated regions 20b has a depth d3 from the surface of the film 11, where d3>d2>d1.

The said exposure step in the fourth embodiment corresponds to the combination of the first, second and third exposure steps in the first embodiment.

The subsequent process steps are the same as those of the first embodiment.

With the semi-transmissive LCD device according to the fourth embodiment of the invention, obviously, the same advantages as those of the first embodiment are obtainable. In addition, another advantage that the irradiated regions 20, 20a and 20b can be formed in the interlayer insulating film 11 as desired through a single exposure step (which is less than that of the first embodiment by two) is obtainable.

Instead of the semi-transmissive film(s) 29b and/or 29c, a light-shielding film or films having a minute pattern or patterns equal to or less than the limit of resolution may be used.

Other Embodiments

The above-described first to fourth embodiments are concrete examples of the present invention. Therefore, needless to say, the present invention is not limited to these embodiments and any modification is applicable to them.

For example, although the interlayer insulating film is formed by a photosensitive acrylic resin in the above-described first to fourth embodiments, the invention is not limited to a photosensitive acrylic resin. Any other material may be used for the interlayer insulating film if it is an organic material having photosensitivity and an insulative and transparent property.

Moreover, although the TFT have the bottom-gate structure in the above-described embodiments, the invention is not limited to this. The TFT may have the top-gate structure if the structure and formation method of the interlayer insulating film are the same as described in the above-described embodiments.

Although the transmission electrode is electrically connected to the drain electrode of the TFT in the above-described embodiments, the reflection electrode may be electrically connected to the drain electrode of the TFT and at the same time, the said reflection electrode may be electrically connected to the transmission electrode.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A semi-transmissive type liquid-crystal display device comprising:
   a first substrate and a second substrate disposed to be opposite at an approximately equal gap;
   a liquid crystal layer disposed between the first substrate and the second substrate;
   switching elements formed on the first substrate for respective pixel regions;
   an interlayer insulating film formed to cover the switching elements on the first substrate; and
   each of the pixel regions being divided into a transmission region where a transmission electrode is formed on the interlayer insulating film and a reflection region where a reflection electrode is formed on the interlayer insulating film;
   wherein a level difference between the transmission region and the reflection region is formed on a surface of the interlayer insulating film in each of the pixel regions.

2. The device according to claim 1, wherein the interlayer insulating film is made of a transmissive insulating material having photosensitivity.

3. The device according to claim 1, wherein the interlayer insulating film is made of a photosensitive acrylic resin.

4. The device according to claim 1, wherein the interlayer insulating film has convex and concave shapes for diffusing the reflected light and enhancing an optical reflection effect on its surface in the reflection region; and
   the interlayer insulating film has contact holes, each of which reaches a corresponding one of the switching elements.

5. The device according to claim 4, wherein the contact holes are located in the respective reflection regions:
   the transmission electrodes are extended to the corresponding contact holes;
   the transmission electrodes are electrically connected to the respective switching elements by way of the corresponding contact holes; and
   the reflection electrodes are electrically connected to the respective transmission electrodes.

6. A method of fabricating a semi-transmissive type liquid-crystal display device, the device comprising:
   a first substrate and a second substrate disposed to be opposite at an approximately equal gap;
   a liquid crystal layer disposed between the first substrate and the second substrate;
   switching elements formed on the first substrate for respective pixel regions;

an interlayer insulating film formed to cover the switching elements on the first substrate; and each of the pixel regions being divided into a transmission region where a transmission electrode is formed on the interlayer insulating film and a reflection region where a reflection electrode is formed on the interlayer insulating film;

the method comprising:

forming an insulating material film having photosensitivity on the first substrate for forming the interlayer insulating film;

exposing parts of the interlayer insulating film corresponding to the transmission regions and parts of the interlayer insulating film corresponding to the reflection regions to light at different exposure energies, respectively; and selectively removing the exposed parts of the interlayer insulating film by development, thereby forming a level difference between the transmission region and the reflection region on a surface of the interlayer insulating film in each of the pixel regions.

7. The method according to claim 6, wherein a first area of the surface of the interlayer insulating film corresponding to the reflection region is selectively exposed to the light at a first exposure energy, thereby forming convex and concave shapes for diffusing the reflected light and enhancing an optical reflection effect in the first area;

a second area of the surface of the interlayer insulating film corresponding to the transmission region is selectively exposed to the light at a second exposure energy different from the first exposure energy, thereby forming the transmission region; and a third area of the surface of the interlayer insulating film is selectively exposed to the light at a third exposure energy different from the first and second exposure energies, thereby forming contact holes reaching the corresponding switching elements.

8. The method according to claim 7, wherein the first, second and third areas of the surface of the interlayer insulating film are simultaneously exposed to the light in a first exposure step;

the second and third areas of the surface of the interlayer insulating film are simultaneously exposed to the light in a second exposure step; and the third area of the surface of the interlayer insulating film is exposed to the light in a third exposure step;

whereby the first, second and third exposure energies corresponding respectively to the first, second and third areas are realized.

9. The method according to claim 7, wherein the first, second and third areas of the surface of the interlayer insulating film are simultaneously exposed to the light in a first exposure step, thereby simultaneously realizing the first exposure energy corresponding to the first area and the second exposure energy corresponding to the second area; and the third area of the surface of the interlayer insulating film is exposed to the light in a second exposure step, thereby realizing the third exposure energy corresponding to the third area.

10. The method according to claim 7, wherein the first, second and third areas of the surface of the interlayer insulating film are simultaneously exposed to the light in a first exposure step, thereby realizing the first exposure energy corresponding to the first area: and the second and third areas of the surface of the interlayer insulating film are simultaneously exposed to the light in a second exposure step, thereby simultaneously realizing the second exposure energy corresponding to the second area and the third exposure energy corresponding to the third area.

11. The method according to claim 7, wherein the first, second and third areas of the surface of the interlayer insulating film are simultaneously exposed to the light, thereby realizing the first exposure energy corresponding to the first area, the second exposure energy corresponding to the second area, and the third exposure energy corresponding to the third area in a single exposure step.

* * * * *